United States Patent
Allen et al.

(10) Patent No.: US 11,573,684 B2
(45) Date of Patent: Feb. 7, 2023

(54) DYNAMIC GRAPHICAL USER INTERFACE MODIFICATION AND MONITORING

(71) Applicant: Snap Inc., Santa Monica, CA (US)

(72) Inventors: Nicholas Richard Allen, Venice, CA (US); Newar Husam Al Majid, New York, NY (US)

(73) Assignee: Snap Inc., Santa Monica, CA (US)

(*) Notice: Subject to any disclaimer, the term of this patent is extended or adjusted under 35 U.S.C. 154(b) by 0 days.

(21) Appl. No.: 17/399,778

(22) Filed: Aug. 11, 2021

(65) Prior Publication Data
US 2022/0214779 A1    Jul. 7, 2022

Related U.S. Application Data

(63) Continuation of application No. 14/951,950, filed on Nov. 25, 2015, now Pat. No. 11,119,628.

(51) Int. Cl.
| | |
|---|---|
| *G06F 3/04817* | (2022.01) |
| *G06F 3/04855* | (2022.01) |
| *H04L 67/50* | (2022.01) |
| *G06F 3/0482* | (2013.01) |
| *G06T 11/60* | (2006.01) |

(52) U.S. Cl.
CPC ........ *G06F 3/0482* (2013.01); *G06F 3/04817* (2013.01); *G06F 3/04855* (2013.01); *G06T 11/60* (2013.01); *H04L 67/535* (2022.05); *G06T 2200/24* (2013.01)

(58) Field of Classification Search
None
See application file for complete search history.

(56) References Cited

U.S. PATENT DOCUMENTS

| | | | |
|---|---|---|---|
| 5,754,939 | A | 5/1998 | Herz et al. |
| 6,038,295 | A | 3/2000 | Mattes |
| 6,158,044 | A | 12/2000 | Tibbetts |
| 6,167,435 | A | 12/2000 | Druckenmiller et al. |
| 6,205,432 | B1 | 3/2001 | Gabbard et al. |
| 6,310,694 | B1 | 10/2001 | Okimoto et al. |
| 6,484,196 | B1 | 11/2002 | Maurille |
| 6,487,586 | B2 | 11/2002 | Ogilvie et al. |

(Continued)

FOREIGN PATENT DOCUMENTS

| | | |
|---|---|---|
| CA | 2887596 A1 | 7/2015 |
| WO | WO-2012000107 A1 | 1/2012 |

(Continued)

OTHER PUBLICATIONS

"U.S. Appl. No. 14/951,950, Examiner Interview Summary dated Jan. 14, 2019", 5 pgs.

(Continued)

*Primary Examiner* — Ryan Barrett
(74) *Attorney, Agent, or Firm* — Schwegman Lundberg & Woessner, P.A.

(57) ABSTRACT

Systems, devices, media, and methods are presented for dynamic presentation and management of messages within a graphical user interface by presenting content icons, monitoring consumption status of the presented content represented by the content icons, transferring a content item from a first set of content to a second set of content, and causing presentation of the content item as part of the second set of content.

20 Claims, 18 Drawing Sheets

(56) References Cited

U.S. PATENT DOCUMENTS

| | | |
|---|---|---|
| 6,665,531 B1 | 12/2003 | Soderbacka et al. |
| 6,701,347 B1 | 3/2004 | Ogilvie |
| 6,711,608 B1 | 3/2004 | Ogilvie |
| 6,757,713 B1 | 6/2004 | Ogilvie et al. |
| 6,980,909 B2 | 12/2005 | Root et al. |
| 7,124,164 B1 | 10/2006 | Chemtob |
| 7,149,893 B1 | 12/2006 | Leonard et al. |
| 7,173,651 B1 | 2/2007 | Knowles |
| 7,243,163 B1 | 7/2007 | Friend et al. |
| 7,278,168 B1 | 10/2007 | Chaudhury et al. |
| 7,356,564 B2 | 4/2008 | Hartselle et al. |
| 7,376,715 B2 | 5/2008 | Cunningham et al. |
| 7,411,493 B2 | 8/2008 | Smith |
| 7,478,402 B2 | 1/2009 | Christensen et al. |
| 7,496,347 B2 | 2/2009 | Puranik |
| 7,519,670 B2 | 4/2009 | Hagale et al. |
| 7,535,890 B2 | 5/2009 | Rojas |
| 7,607,096 B2 | 10/2009 | Oreizy et al. |
| 7,703,140 B2 | 4/2010 | Nath et al. |
| 7,912,896 B2 | 3/2011 | Wolovitz et al. |
| 8,131,597 B2 | 3/2012 | Hudetz |
| 8,170,957 B2 | 5/2012 | Richard |
| 8,199,747 B2 | 6/2012 | Rojas et al. |
| 8,214,443 B2 | 7/2012 | Hamburg |
| 8,238,947 B2 | 8/2012 | Lottin et al. |
| 8,244,593 B2 | 8/2012 | Klinger et al. |
| 8,312,097 B1 | 11/2012 | Siegel et al. |
| 8,332,475 B2 | 12/2012 | Rosen et al. |
| 8,570,907 B2 | 10/2013 | Garcia, Jr. et al. |
| 8,718,333 B2 | 5/2014 | Wolf et al. |
| 8,724,622 B2 | 5/2014 | Rojas |
| 8,745,132 B2 | 6/2014 | Obradovich |
| 8,874,677 B2 | 10/2014 | Rosen et al. |
| 8,909,679 B2 | 12/2014 | Root et al. |
| 8,909,714 B2 | 12/2014 | Agarwal et al. |
| 8,909,725 B1 | 12/2014 | Sehn |
| 8,914,752 B1 | 12/2014 | Spiegel |
| 8,995,433 B2 | 3/2015 | Rojas |
| 9,040,574 B2 | 5/2015 | Wang et al. |
| 9,055,416 B2 | 6/2015 | Rosen et al. |
| 9,083,770 B1 | 7/2015 | Drose et al. |
| 9,094,137 B1 | 7/2015 | Sehn et al. |
| 9,100,806 B2 | 8/2015 | Rosen et al. |
| 9,100,807 B2 | 8/2015 | Rosen et al. |
| 9,113,301 B1 | 8/2015 | Spiegel et al. |
| 9,148,424 B1 | 9/2015 | Yang |
| 9,191,776 B2 | 11/2015 | Root et al. |
| 9,204,252 B2 | 12/2015 | Root |
| 9,225,805 B2 | 12/2015 | Kujawa et al. |
| 9,225,897 B1 | 12/2015 | Sehn et al. |
| 9,237,202 B1 | 1/2016 | Sehn |
| 9,264,463 B2 | 2/2016 | Rubinstein et al. |
| 9,276,886 B1 | 3/2016 | Samaranayake |
| 9,294,425 B1 | 3/2016 | Son |
| 9,385,983 B1 | 7/2016 | Sehn |
| 9,396,354 B1 | 7/2016 | Murphy et al. |
| 9,407,712 B1 | 8/2016 | Sehn |
| 9,407,816 B1 | 8/2016 | Sehn |
| 9,430,783 B1 | 8/2016 | Sehn |
| 9,443,227 B2 | 9/2016 | Evans et al. |
| 9,482,882 B1 | 11/2016 | Hanover et al. |
| 9,482,883 B1 | 11/2016 | Meisenholder |
| 9,489,661 B2 | 11/2016 | Evans et al. |
| 9,491,134 B2 | 11/2016 | Rosen et al. |
| 9,532,171 B2 | 12/2016 | Allen et al. |
| 9,537,811 B2 | 1/2017 | Allen et al. |
| 9,560,006 B2 | 1/2017 | Prado et al. |
| 9,628,950 B1 | 4/2017 | Noeth et al. |
| 9,652,896 B1 | 5/2017 | Jurgenson et al. |
| 9,659,244 B2 | 5/2017 | Anderton et al. |
| 9,693,191 B2 | 6/2017 | Sehn |
| 9,705,831 B2 | 7/2017 | Spiegel |
| 9,742,713 B2 | 8/2017 | Spiegel et al. |
| 9,745,077 B1 | 8/2017 | Lentz et al. |
| 9,785,796 B1 | 10/2017 | Murphy et al. |
| 9,825,898 B2 | 11/2017 | Sehn |
| 9,854,219 B2 | 12/2017 | Sehn |
| 9,961,520 B2 | 5/2018 | Brooks et al. |
| 10,812,432 B1 * | 10/2020 | Adkins ............... H04L 51/216 |
| 11,119,628 B1 | 9/2021 | Allen et al. |
| 2002/0047868 A1 | 4/2002 | Miyazawa |
| 2002/0144154 A1 | 10/2002 | Tomkow |
| 2003/0052925 A1 | 3/2003 | Daimon et al. |
| 2003/0126215 A1 | 7/2003 | Udell |
| 2003/0135558 A1 | 7/2003 | Bellotti et al. |
| 2003/0217106 A1 | 11/2003 | Adar et al. |
| 2004/0203959 A1 | 10/2004 | Coombes |
| 2005/0097176 A1 | 5/2005 | Schatz et al. |
| 2005/0198128 A1 | 9/2005 | Anderson |
| 2005/0223066 A1 | 10/2005 | Buchheit et al. |
| 2006/0242239 A1 | 10/2006 | Morishima et al. |
| 2006/0270419 A1 | 11/2006 | Crowley et al. |
| 2007/0038715 A1 | 2/2007 | Collins et al. |
| 2007/0064899 A1 | 3/2007 | Boss et al. |
| 2007/0073823 A1 | 3/2007 | Cohen et al. |
| 2007/0214216 A1 | 9/2007 | Carrer et al. |
| 2007/0233801 A1 | 10/2007 | Eren et al. |
| 2008/0055269 A1 | 3/2008 | Lemay et al. |
| 2008/0120409 A1 | 5/2008 | Sun et al. |
| 2008/0207176 A1 | 8/2008 | Brackbill et al. |
| 2008/0270938 A1 | 10/2008 | Carlson |
| 2008/0306826 A1 | 12/2008 | Kramer et al. |
| 2008/0313346 A1 | 12/2008 | Kujawa et al. |
| 2009/0042588 A1 | 2/2009 | Lottin et al. |
| 2009/0132453 A1 | 5/2009 | Hangartner et al. |
| 2010/0082427 A1 | 4/2010 | Burgener et al. |
| 2010/0131880 A1 | 5/2010 | Lee et al. |
| 2010/0185665 A1 | 7/2010 | Horn et al. |
| 2010/0306669 A1 | 12/2010 | Della Pasqua |
| 2011/0099507 A1 | 4/2011 | Nesladek et al. |
| 2011/0145564 A1 | 6/2011 | Moshir et al. |
| 2011/0202598 A1 | 8/2011 | Evans et al. |
| 2011/0213845 A1 | 9/2011 | Logan et al. |
| 2011/0286586 A1 | 11/2011 | Saylor et al. |
| 2011/0320373 A1 | 12/2011 | Lee et al. |
| 2012/0028659 A1 | 2/2012 | Whitney et al. |
| 2012/0084707 A1 | 4/2012 | Abdel-kader et al. |
| 2012/0184248 A1 | 7/2012 | Speede |
| 2012/0209921 A1 | 8/2012 | Adafin et al. |
| 2012/0209924 A1 | 8/2012 | Evans et al. |
| 2012/0254325 A1 | 10/2012 | Majeti et al. |
| 2012/0278692 A1 | 11/2012 | Shi |
| 2012/0304080 A1 | 11/2012 | Wormald et al. |
| 2013/0071093 A1 | 3/2013 | Hanks et al. |
| 2013/0117702 A1 | 5/2013 | Jang et al. |
| 2013/0194301 A1 | 8/2013 | Robbins et al. |
| 2013/0290443 A1 | 10/2013 | Collins et al. |
| 2014/0013250 A1 | 1/2014 | Dubey et al. |
| 2014/0032682 A1 | 1/2014 | Prado et al. |
| 2014/0106717 A1 | 4/2014 | Hanson et al. |
| 2014/0108246 A1 | 4/2014 | Hanson et al. |
| 2014/0108952 A1 | 4/2014 | Hanson et al. |
| 2014/0122787 A1 | 5/2014 | Shalvi et al. |
| 2014/0201527 A1 | 7/2014 | Krivorot |
| 2014/0282096 A1 | 9/2014 | Rubinstein et al. |
| 2014/0325383 A1 | 10/2014 | Brown et al. |
| 2014/0337791 A1 | 11/2014 | Agnetta et al. |
| 2014/0359024 A1 | 12/2014 | Spiegel |
| 2014/0359032 A1 | 12/2014 | Spiegel et al. |
| 2015/0199082 A1 | 7/2015 | Scholler et al. |
| 2015/0227602 A1 | 8/2015 | Ramu et al. |
| 2015/0271126 A1 | 9/2015 | Menayas et al. |
| 2015/0271638 A1 * | 9/2015 | Menayas ............... H04W 4/21 455/456.3 |
| 2016/0011766 A1 | 1/2016 | Kosaka et al. |
| 2016/0085773 A1 | 3/2016 | Chang et al. |
| 2016/0085863 A1 | 3/2016 | Allen et al. |
| 2016/0086670 A1 | 3/2016 | Gross et al. |
| 2016/0099901 A1 | 4/2016 | Allen et al. |
| 2016/0180887 A1 | 6/2016 | Sehn |
| 2016/0277419 A1 | 9/2016 | Allen et al. |
| 2016/0321708 A1 | 11/2016 | Sehn |
| 2016/0359957 A1 | 12/2016 | Laliberte |
| 2016/0359987 A1 | 12/2016 | Laliberte |

(56) References Cited

U.S. PATENT DOCUMENTS

| | | |
|---|---|---|
| 2017/0161382 A1 | 6/2017 | Ouimet et al. |
| 2017/0177170 A1 | 6/2017 | Ding et al. |
| 2017/0263029 A1 | 9/2017 | Yan et al. |
| 2017/0287006 A1 | 10/2017 | Azmoodeh et al. |
| 2017/0295250 A1 | 10/2017 | Samaranayake et al. |
| 2017/0329614 A1 | 11/2017 | Schon et al. |
| 2017/0374003 A1 | 12/2017 | Allen et al. |
| 2017/0374508 A1 | 12/2017 | Davis et al. |
| 2021/0160590 A1* | 5/2021 | Aher .................. H04N 21/2668 |
| 2021/0382681 A1* | 12/2021 | Gibson ................. H04L 65/762 |

FOREIGN PATENT DOCUMENTS

| | | | |
|---|---|---|---|
| WO | WO-2013008251 | A2 | 1/2013 |
| WO | WO-2014194262 | A2 | 12/2014 |
| WO | WO-2015192026 | A1 | 12/2015 |
| WO | WO-2016054562 | A1 | 4/2016 |
| WO | WO-2016065131 | A1 | 4/2016 |
| WO | WO-2016/112299 | A1 | 7/2016 |
| WO | WO-2016179166 | A1 | 11/2016 |
| WO | WO-2016179235 | A1 | 11/2016 |
| WO | WO-2017176739 | A1 | 10/2017 |
| WO | WO-2017176992 | A1 | 10/2017 |
| WO | WO-2018005644 | A1 | 1/2018 |

OTHER PUBLICATIONS

"U.S. Appl. No. 14/951,950, Final Office Action dated Oct. 17, 2018", 29 pgs.
"U.S. Appl. No. 14/951,950, Final Office Action dated Nov. 18, 2019", 30 pgs.
"U.S. Appl. No. 14/951,950, Non Final Office Action dated Feb. 7, 2018", 25 pgs.
"U.S. Appl. No. 14/951,950, Non Final Office Action dated May 27, 2020", 31 pgs.
"U.S. Appl. No. 14/951,950, Non Final Office Action dated Jun. 10, 2019", 31 pgs.
"U.S. Appl. No. 14/951,950, Notice of Allowance dated Jan. 25, 2021", 5 pgs.
"U.S. Appl. No. 14/951,950, Notice of Allowance dated May 5, 2021", 5 pgs.
"U.S. Appl. No. 14/951,950, Resonse filed Jan. 17, 2019 to Final Office Action dated Oct. 17, 2019", 12 pgs.
"U.S. Appl. No. 14/951,950, Response filed Feb. 18, 2020 to Final Office Action dated Nov. 18, 2019", 11 pgs.
"U.S. Appl. No. 14/951,950, Response filed Oct. 10, 2019 to Non-Final Office Action dated Jun. 10, 2019", 11 pgs.
"U.S. Appl. No. 14/951,950, Response filed Nov. 25, 2020 to Non Final Office Action dated May 27, 2020", 11 pgs.
"U.S. Appl. No. 14/951,950, Response filed Aug. 7, 2018 to Non Final Office Action dated Feb. 7, 2018", 17 pgs.
"Mark as read delay in Outlook", May 27, 2010, https://web.archive.Org/web/20110405062319/https://www.virtualhelp.me/windows/60-mark-as-read-delay-in-outlook, 3 pgs.
Castelluccia, Claude, et al., "EphPub: Toward robust Ephemeral Publishing", 19th IEEE International Conference on Network Protocols (ICNP), (Oct. 17, 2011), 18 pgs.
Fajman, "An Extensible Message Format for Message Disposition Notifications", Request for Comments: 2298, National Institutes of Health, (Mar. 1998), 28 pgs.
Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.
Melanson, Mike, "This text message will self destruct in 60 seconds", [Online] Retrieved from the Internet: <URL: http://readwrite.com/2011/02/11/this_text_message_will_self_destruct_in_60_seconds>, (Feb. 18, 2015), 4 pgs.
Sawers, Paul, "Snapchat for iOS Lets You Send Photos to Friends and Set How long They're Visible For", [Online] Retrieved from the Internet: <URL: https://thenextweb.com/apps/2012/05/07/snapchat-for-ios-lets-you-send-photos-to-friends-and-set-how-long-theyre-visible-for/>, (May 7, 2012), 5 pgs.
Shein, Esther, "Ephemeral Data", Communications of the ACM, vol. 56, No. 9, (Sep. 2013), 3 pgs.
Vaas, Lisa, "StealthText, Should You Choose to Accept It", [Online] Retrieved from the Internet: <URL: http://www.eweek.eom/print/c/a/MessagingandCollaboration/StealthTextShouldYouChoosetoAcceptIt>, (Dec. 13, 2005), 2 pgs.
U.S. Appl. No. 14/951,950, filed Nov. 25, 2015, Dynamic Graphical User Interface Modification and Monitoring.

\* cited by examiner

DYNAMIC GRAPHICAL USER INTERFACE MODIFICATION AND MONITORING

PRIORITY CLAIM

This application is a continuation of and claims the benefit of priority of U.S. patent application Ser. No. 14/951,950, filed Nov. 25, 2015, which is hereby incorporated by reference herein in its entirety.

TECHNICAL FIELD

Embodiments of the present disclosure relate generally to a graphical user interface for data communications. More particularly, but not by way of limitation, the present disclosure addresses systems and methods for dynamically presenting and modifying communications data within a graphical user interface based on a monitored condition.

BACKGROUND

Telecommunications applications and devices can provide communication between multiple users using a variety of media, such as text, images, sound recordings, and/or video recording. These applications may present single items of communication data representing messages sent by a user to another user. Where these applications present communication data from multiple users, the communication data is presented in a single organizational scheme. User interface elements presented in these telecommunications applications are typically static in presentation and organization. Accordingly, there is still a need in the art to improve presentation and organization of communication data between devices and accessibility of operations on communications devices.

BRIEF DESCRIPTION OF THE DRAWINGS

Various ones of the appended drawings merely illustrate example embodiments of the present disclosure and should not be considered as limiting its scope.

Figure 1:
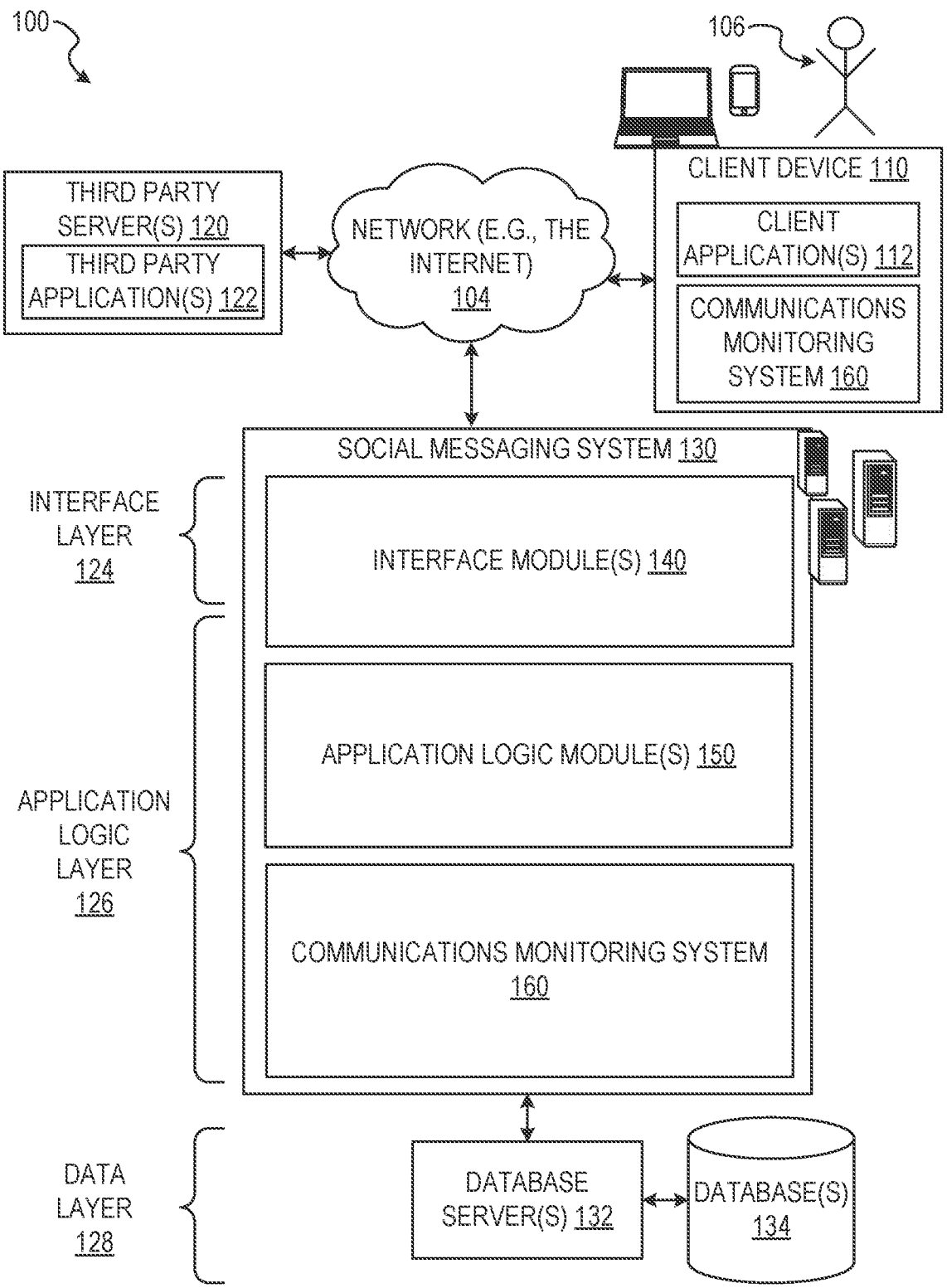
FIG. 1 is a block diagram illustrating a networked system, according to some example embodiments.

The headings provided herein are merely for convenience and do not necessarily affect the scope or meaning of the terms used.

DETAILED DESCRIPTION

The description that follows includes systems, methods, techniques, instruction sequences, and computing machine program products illustrative of embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In one embodiment, an application operating on a device includes content icons for friends within a graphical user interface, and each icon is further associated with content from the corresponding friend. The icons are divided into two groups, with the first group including unconsumed content, and the second group including consumed content. The two groups are separated in the interface, with the first group at the top of a list and the second group at the bottom of the list. The user interface allows a user to scroll along the icons for the users and to select an icon to consume content associated with the icon. A scroll bar that is part of the interface includes a graphical indication of the two groups. If twenty of the friends have unconsumed content, the top twenty percent of the scroll bar appears graphically different from the rest of the scroll bar using colors, thickness, patterning, or any other such indication. The system monitors the first group of content, and when a user selects an icon from a friend with unconsumed content and views or otherwise consumes the content for that user, the icon for that user is moved to the second group. If a user views content from ten of the twenty friends associated with unconsumed content, and none of the other friends add content in that time, then the presentation of the scroll bar will automatically adjust to match the split between the first and second group.

The above is one specific example. The various embodiments of the present disclosure relate to devices and instructions by one or more processors of a device to manage messages in a communication system. The communication system may be an ephemeral message system designed to limit recipient access to some or all messages communicated using the system. For example, some ephemeral message systems may be configured to automatically delete a message with a picture after the picture has been displayed on a screen for a certain amount of time. An ephemeral message including a video may include a trigger to automatically delete the video after it has been viewed a set number of times or within a set time after the first viewing. Some ephemeral message systems may be configured to automatically delete a chat message when a user navigates away from a user interface element presenting the chat message. Other embodiments can limit access to messages in other ways, or may use different combinations of limitations.

In various embodiments, message management within a communication system involves presenting messages at a client device within a graphical user interface. In some instances, a message is displayed using a message icon such that content of the message is presented upon selection of a user interface element in the form of a message icon. In some instances, message icons represent one or more of a message type (e.g., a video message, a text based message, an image), a content originator (e.g., an author of the content, a user forwarding content from another author, an organization producing or distributing content), and other information about the content of the message.

Message management may also involve the organization of messages presented on the graphical user interface. Messages may be divided among consumed messages and unconsumed messages. The messages may be organized within the graphical user interface based on a combination of consumption status, the message type, the content originator, sponsorship of the message, promotion of the message, relationship of a viewer to the content originator (e.g., a social media connection to the content originator), and combinations thereof. Messages may be presented using differing groups based on the factors described above. Further, differing organization schemes may be applied to the differing groups of messages based on one or more of the factors described above. A change in consumption status may cause a message to be converted from one group to another group, which may include a change in the organizational scheme applied to the newly converted message. Conversion of messages based on the consumption status of the message may be performed by modifying a trigger, tag, bit, or other metadata of the message.

In this context, consumed messages are messages which have content that has been played, viewed, or otherwise presented on the graphical user interface by selecting a message icon associated with the message. Unconsumed messages are messages with content which has not yet been played, viewed, or otherwise presented on the graphical user interface. For example, unconsumed messages may be represented by a message icon. Upon selection of the message icon, a content of the message is played, viewed, or otherwise presented on the graphical user interface. After the content has been presented on the graphical user interface, the previously unconsumed message is converted into a consumed message.

In several of the example embodiments, message icons, representing messages, are presented within a graphical user interface displayed on a device. A communication monitoring system organizes and causes presentation of the graphical user interface to organize messages to present users with unconsumed messages and consumed messages in a navigable manner. The user may navigate through unconsumed and consumed messages, organized using differing schemes, in an unobstructed flow. The communication monitoring system presents message icons and consumption indications such that a user navigating through the flow of messages may immediately identify whether the message icons presented in a viewable area of the graphical user interface are consumed or unconsumed, their placement within the flow of messages, and a relative position of the unconsumed messages in relation to the consumed messages.

In some example embodiments, a consumption indicator can present a number, proportion, or other representation of the unconsumed messages in relation to the consumed messages, regardless of whether message icons representing unconsumed messages are currently presented in a viewable area of the graphical user interface. The consumption indicator may also present a representation of the organizational scheme of the portion of the message flow viewable at any given position on the graphical user interface.

The communication monitoring system monitors various aspects of the message icons, messages, inputs into the graphical user interface, and outputs of the device (e.g., outputs from a display device, an audio device, or haptic devices). The communication monitoring system may monitor messages transmitted to a device for view, as well as a consumption status of messages having message icons presented on the graphical user interface. The communication monitoring system may also monitor device input with respect to the graphical user interface. In various embodiments, the communication monitoring system dynamically modifies the aspects of the graphical user interface based on changes in status of the messages, position of message icons in the viewable area of the graphical user interface, a type of input received by the device, a position of input on a touchscreen of the device, and other factors.

FIG. 1 is a network diagram depicting a network system 100 having a client-server architecture configured for exchanging data over a network, according to one embodiment. For example, the network system 100 may be a messaging system where clients communicate and exchange data within the network system 100. The data may pertain to various functions (e.g., sending and receiving text and media communication, determining geolocation, etc.) and aspects (e.g., transferring communications data, receiving and transmitting indications of communication sessions, etc.) associated with the network system 100 and its users. Although illustrated herein as client-server architecture, other embodiments may include other network architectures, such as peer-to-peer or distributed network environments.

As shown in FIG. 1, the network system 100 includes a social messaging system 130. The social messaging system 130 is generally based on a three-tiered architecture, consisting of an interface layer 124, an application logic layer 126, and a data layer 128. As is understood by skilled artisans in the relevant computer and Internet-related arts, each module or engine shown in FIG. 1 represents a set of executable software instructions (e.g., processor-executable instructions) and the corresponding hardware (e.g., memory and processor) for executing the instructions, forming a hardware-implemented module or engine and acting, at the time of the execution of instructions, as a special purpose machine configured to carry out a particular set of functions. To avoid obscuring the inventive subject matter with unnecessary detail, various functional modules and engines that are not germane to conveying an understanding of the inventive subject matter have been omitted from FIG. 1. Of course, additional functional modules and engines may be used with a social messaging system 130, such as that illustrated in FIG. 1, to facilitate additional functionality that is not specifically described herein. Furthermore, the various functional modules and engines depicted in FIG. 1 may reside on a single server computer or client device, or may be distributed across several server computers or client devices in various arrangements. Moreover, although the social messaging system 130 is depicted in FIG. 1 as a three-tiered architecture, the inventive subject matter is by no means limited to such an architecture.

As shown in FIG. 1, the interface layer 124 consists of interface modules (e.g., a web server) 140, which receives requests from various client-computing devices and servers, such as client devices 110 executing client application(s) 112, and third party servers 120 executing third party application(s) 122. In response to received requests, the interface module 140 communicates appropriate responses to requesting devices via a network 104. For example, the interface modules 140 can receive requests such as Hypertext Transfer Protocol (HTTP) requests, or other web-based, application programming interface (API) requests.

The client devices 110 can execute conventional web browser applications or applications (also referred to as "apps") that have been developed for a specific platform to include any of a wide variety of mobile computing devices and mobile-specific operating systems (e.g., IOS™, ANDROID™, WINDOWS® PHONE). Further, in some example embodiments, the client devices 110 form all or part of a communications monitoring system 160 such that modules of the communications monitoring system 160 configure the client device 110 to perform a specific set of functions with respect to operations of the communications monitoring system 160.

In an example, the client devices 110 are executing the client application(s) 112. The client application(s) 112 can provide functionality to present information to a user 106 and communicate via the network 104 to exchange information with the social messaging system 130. Further, in some examples, the client devices 110 monitor and dynamically modify a graphical user interface depicting representations of communication data by executing functionality of the communications monitoring system 160.

Each of the client devices 110 can comprise a computing device that includes at least a display and communication capabilities with the network 104 to access the social messaging system 130, other client devices, and third party servers 120. The client devices 110 comprise, but are not limited to, remote devices, work stations, computers, Internet appliances, hand-held devices, wireless devices, portable devices, wearable computers, cellular or mobile phones, personal digital assistants (PDAs), smart phones, tablets, ultrabooks, netbooks, laptops, desktops, multi-processor systems, microprocessor-based or programmable consumer electronics, game consoles, set-top boxes, network PCs, mini-computers, and the like. User 106 can be a person, a machine, or other means of interacting with the client devices 110. In some embodiments, the user 106 interacts with the social messaging system 130 via the client devices 110. The user 106 may not be part of the networked environment, but may be associated with the client devices 110.

As shown in FIG. 1, the data layer 128 has database servers 132 that facilitate access to information storage repositories or databases 134. The databases 134 are storage devices that store data such as member profile data, social graph data (e.g., relationships between members of the social messaging system 130), image modification preference data, accessibility data, and other user data.

An individual can register with the social messaging system 130 to become a member of the social messaging system 130. Once registered, a member can form social network relationships (e.g., friends, followers, or contacts) on the social messaging system 130 and interact with a broad range of applications provided by the social messaging system 130.

The application logic layer 126 includes various application logic modules 150, which, in conjunction with the interface modules 140, generate various user interfaces with data retrieved from various data sources or data services in the data layer 128. Individual application logic modules 150 may be used to implement the functionality associated with various applications, services, and features of the social messaging system 130. For instance, a social messaging application can be implemented with the application logic modules 150. The social messaging application provides a messaging mechanism for users 106 of the client devices 110 to send and receive messages that include text and media content such as pictures and video. The client devices 110 may access and view the messages from the social messaging application for a specified period of time (e.g., limited or unlimited). In an example, a particular message is accessible to a message recipient for a predefined duration (e.g., specified by a message sender) that begins when the particular message is first accessed. After the predefined duration elapses, the message is deleted and is no longer accessible to the message recipient. Of course, other applications and services may be separately embodied in their own application logic modules 150.

As illustrated in FIG. 1, the social messaging system 130 may include at least a portion of the communications monitoring system 160 capable of monitoring and dynamically modifying a graphical user interface depicting representations of communication data. Similarly, the client device 110 includes a portion of the communications monitoring system 160, as described above. In other examples, client device 110 may include the entirety of the communications monitoring system 160. In instances where the client device 110 includes a portion of (or all of) the communications monitoring system 160, the client device 110 can work alone or in cooperation with the social messaging system 130 to provide the functionality of the communications monitoring system 160 described herein.

In some embodiments, the social messaging system 130 may be an ephemeral message system that enables ephemeral communications where content (e.g. video clips or images) are deleted following a deletion trigger event such as a viewing time or viewing completion. In such embodiments, a device may use the various modules described herein within the context of any of generating, sending, receiving, or displaying aspects of an ephemeral message. For example, a device may track a consumption indicator or a touchscreen interaction during viewing of an ephemeral message, and may implement any tracking, command, or interface method described herein, both as part of generation of content for an ephemeral message or as part of a user 106 viewing an ephemeral message. In some embodiments, while the ephemeral message is deleted after the deletion trigger event, a content icon, indicating the originator of the ephemeral message and representing the ephemeral message prior to consumption, may remain depicted in the graphical user interface. Further, in some embodiments, where the content icon remains after deletion of the ephemeral message, the communications monitoring system 160 causes a presentation change to the content icon indicating the deletion of the ephemeral message.

Figure 2:
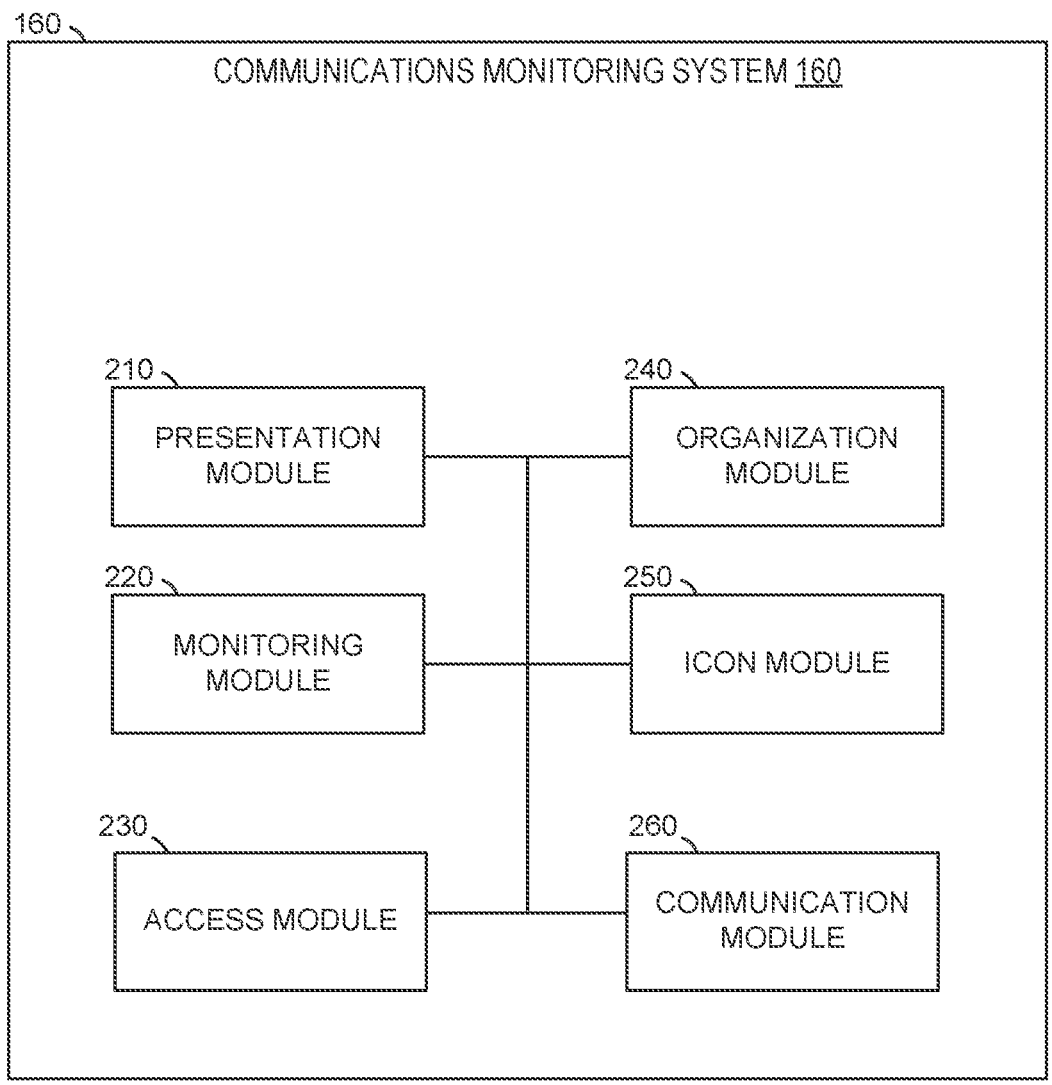
FIG. 2 is a diagram illustrating a communications monitoring system, according to some example embodiments.

In FIG. 2, in various embodiments, the communications monitoring system 160 can be implemented as a standalone system or implemented in conjunction with the client device 110, and is not necessarily included in the social messaging system 130. The communications monitoring system 160 is shown to include a presentation module 210, a monitoring module 220, an access module 230, an organization module 240, an icon module 250, and a communication module 260. All, or some, of the modules 210-260, communicate with each other, for example, via a network coupling, shared memory, and the like. Each module of modules 210-260 can be implemented as a single module, combined into other modules, or further subdivided into multiple modules. Other modules not pertinent to example embodiments can also be included, but are not shown.

The presentation module 210 generates a graphical user interface through which the communications monitoring system 160 organizes and supplies content. In various example embodiments, the presentation module 210 causes presentation of content icons in the form of user interface elements representing message data or other content to be presented within the graphical user interface. Content icons may be presented in specified organization schemes within the graphical user interface and may be dynamically reordered based on monitored conditions. In these embodiments, the presentation module 210, in cooperation with the monitoring module 220, may reorder, modify display characteristics, and make other suitable modifications to the content icons based on conditions monitored by the monitoring module 220.

In various embodiments, the presentation module 210 presents a consumption indicator representing a consumption status of message content indicated by the content icons. For example, the presentation module 210 may present the consumption indicator with varying colors, sizes, shapes, and other representative aspects indicating numbers, proportions, or locations of message content according to whether the message content has been consumed. In these embodiments, message content is consumed when it is viewed, played, or otherwise presented on the client device 110. For example, message content (e.g., video content) may be deemed as consumed when played within the graphical user interface. By way of further example, message content (e.g., audio content) may be deemed as consumed when output through a suitable output device (e.g., speaker) of the client device 110.

The monitoring module 220 monitors aspects of user interaction with the graphical user interface via the client device 110. In various example embodiments, the monitoring module 220 monitors predetermined monitoring conditions such as consumption status of message content, content icon positions, consumption indicator positions, position change magnitudes, and obstructions to the graphical user interface. Consumption status may be monitored by identifying and monitoring metadata associated with the message content, and identifying a modification to the metadata. A consumption status may be represented by a value (e.g., a binary value) stored within a system, and adjusted in response to monitoring of the consumption status. For example, when the system determines that a user has selected and viewed a previously unviewed message, the consumption status changes and the value representing the consumption status changes. Such changes may be managed using consumption notifications as described below. Monitoring of positions of content icons and consumption indicators as well as position change magnitudes may be performed by communication between the presentation module 210 and the monitoring module 220 to indicate placement and relative placement of user interface elements. In various embodiments, obstructions are user input via a touchscreen of the client device 110 where a finger, stylus, or other contact apparatus making contact with the touchscreen causes at least a partial obstruction of the graphical user interface.

The access module 230 accesses various data objects and notifications. For example, in some embodiments, the access module 230 accesses monitoring notifications indicating changes or modifications with respect to the content icons and message content. In some instances, monitoring notifications include consumption notifications indicating a change in consumption status of message content. The consumption notification may be accessed or otherwise received by the access module 230, in cooperation with the monitoring module 220, to pass to one or more of the organization module 240 and the presentation module 210.

The organization module 240 organizes content icons and message content for presentation by the presentation module 210 based on predetermined organization schemes and input from one or more of the presentation module 210, the monitoring module 220, and the access module 230. In various embodiments, the organization module 240 transfers one or more of a content icon and message content associated with the content icon from one set of content to another. For example, the organization module 240 may receive a consumption notification and cause an associated content icon and its message content to be removed from a first set of content and added to a second set of content. Where the content icon and associated message content are transferred to the second set of content, the organization module 240 may determine the predetermined organizational scheme of the second set of content, or a suitable organization scheme, to be applied and place the content icon and message content into an appropriate location within the second set of content ordered according to the organization scheme.

The icon module 250 determines and provides initial and modified values for user interface elements presented within the graphical user interface displayed on the client device 110. In various embodiments, the icon module 250 initially sizes a consumption indicator, and portions thereof, to indicate a consumption status on content items represented within the graphical user interface. The icon module 250, in some instances, modifies a size, position, or other aspects of the consumption indicator. In some embodiments, the icon module 250 initially sizes and positions (e.g., determines values for a size and a position) content icons presented in the graphical user interface by the presentation module 210.

The communication module 260 provides various communications functionality. For example, the communications module 260 receives message data from one or more of the social messaging system 130 and client devices communicating with the client device 110. The communication module 260 may cause transmission of message data or indications of consumption of message data to a client device of another user 106 via a communications network 104. In some embodiments, the communication module 260 enables communication between one or more of the presentation module 210, the monitoring module 220, the access module 230, the organization module 240, and the icon module 250.

Figure 3:
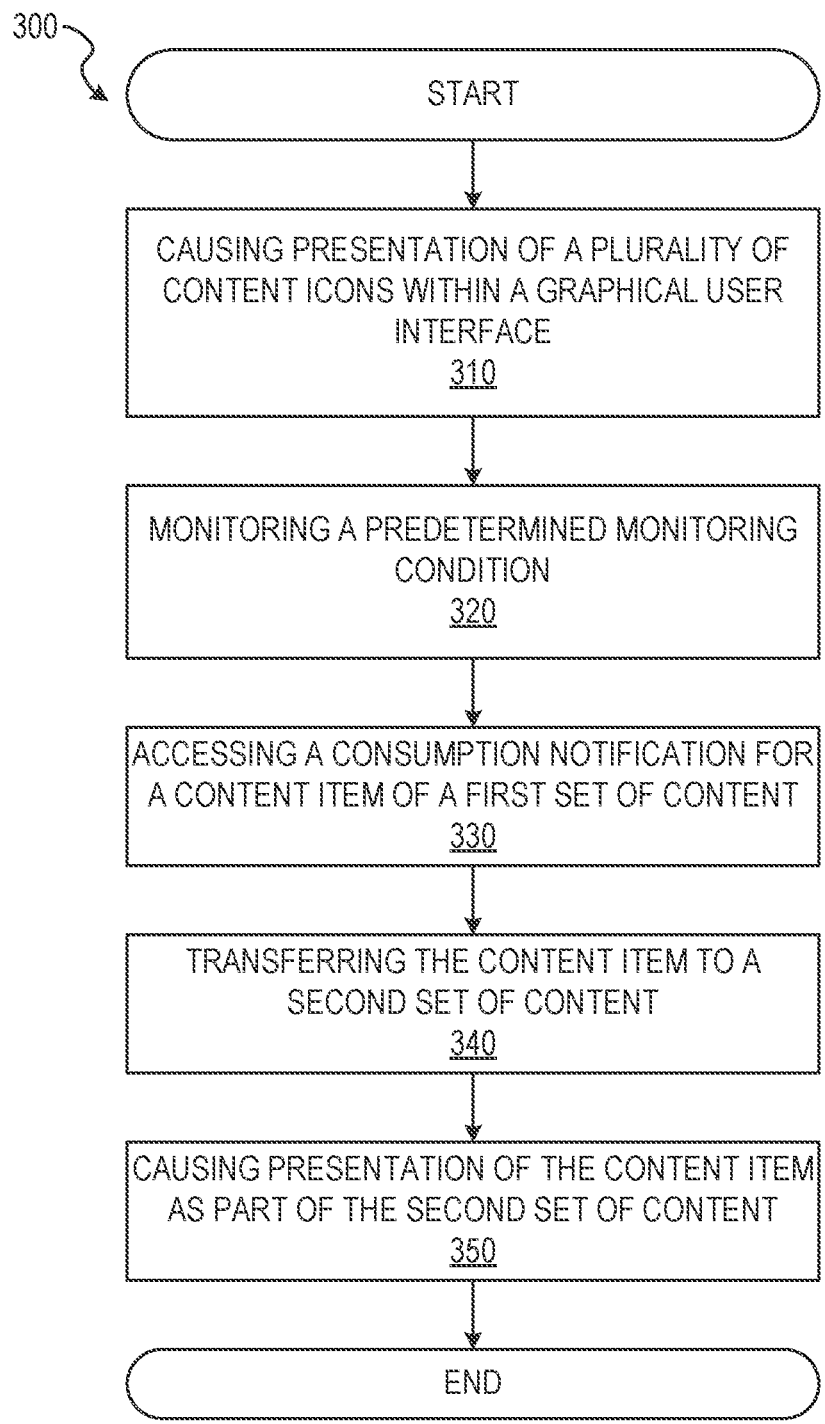
FIG. 3 is a flow diagram illustrating an example method for monitoring and dynamically modifying presentation of communication data within a graphical user interface, according to some example embodiments.

FIG. 3 depicts a flow diagram illustrating an example method 300 for monitoring and dynamically modifying presentation of communication data, and representations thereof, within a graphical user interface based on one or more monitored conditions. The operations of method 300 may be performed by components of the communications monitoring system 160, and are so described below for purposes of illustration.

Figure 4:
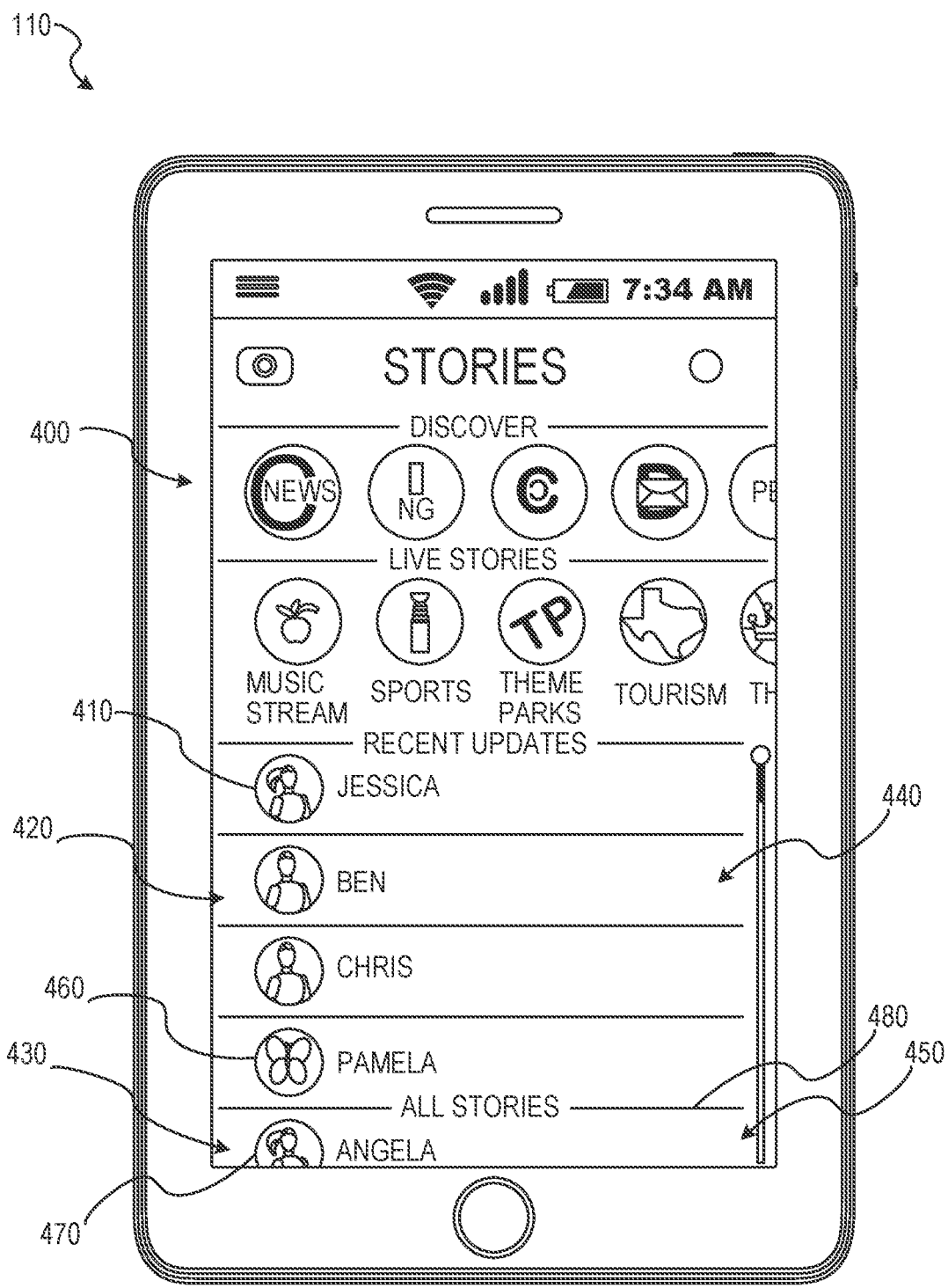
FIG. 4 illustrates an example presentation of communication data within a graphical user interface, according to some example embodiments.

In operation 310, the presentation module 210 causes presentation of a plurality of content icons within a graphical user interface 400. The content icons may represent an originator of communications data (e.g., a content item). The content icons may be displayed on the graphical user interface 400 in order to represent content items from the content originator. For example, in various embodiments, as shown in FIG. 4, a plurality of content icons 410 represent a first set of content 420 and a second set of content 430. The first set of content 420 is unconsumed content and the second set of content 430 is previously consumed content. The unconsumed content is communication data (e.g., messages, videos, text data, audio data) which has not yet been viewed, played, otherwise presented at the client device 110 (e.g., through an audio output or the graphical user interface 400). The previously consumed data is communication data which has already been played, viewed, or otherwise presented by the graphical user interface 400 presented at the client device 110.

The first set of content icons 420 may be presented in a first area 440 of the graphical user interface 400 and the second set of content 420 may be presented in a second area 450 of the graphical user interface 400. For example, where the graphical user interface 400 presents a screen having a combination of the first set of content 420 and the second set of content 430, the first set of content 420 may be presented proximate to an upper portion of a display device providing greater prominence to the first set of content 420 and indicating the consumption status of the first set of content 420 being unconsumed. By way of further example, where the first set of content 420 and the second set of content 430 include a plurality of user interface elements (e.g., content icons 410) sufficient to be displayed across multiple screens (e.g., an area greater than a viewable area of the display device of the client device 110) or on a portion of a screen accessible by a scrolling function, all or a portion of the second set of content 430 may be initially on the portion of the screen accessed by scrolling (e.g., not initially presented within an initial display of the graphical user interface 400).

In some instances, the first set of content 420 and the second set of content 430 may be presented proximate to one another. For example, the first set of content 420 may be presented in a list format or table with a last content item 460 in the first set of content icons 420 positioned proximate to a first content item 470 of the second set of content 430, with the second set of content 430 presented in a list format or table similar to the first set of content, organized according to a different organizational scheme. In some instances, a division element 480 (e.g., a user interface element delineating a division between the first set of content 420 and the second set of content 430) is presented as a graphical user interface element. For example, as shown in FIG. 4, the division element 480 provides a division between the first set of content 420 and the second set of content 430 in the form of a line with an accompanying label.

In various example embodiments, the first set of content 420 has a first order and the second set of content 430 has a second order distinct from the first order. For example, in some instances, the first order organizes the first set of content 420 based on a time of receipt of each content item of the first set of content 420. The second order may organize the second set of content 430 based on an identity of a content originator for each content item of the second set of content 430.

In some example embodiments, the first set of content 420 is wholly unconsumed. For example, content items within the first set of content items 420 may be presented when they are initially transmitted to the client device 110 where the content items have not been subject to a user interaction. The second set of content 430 may comprise mixed consumption status. In some instances, one or more of the content items of the second set of content 430 is completely consumed (e.g., viewed), partially consumed, or completely unconsumed. Where a content item is completely consumed, the content icon associated with the content item may be presented in a distinctive manner to indicate all of the associated content has been consumed. For example, the content icon of the consumed content item may be depicted as completely grayscale or with a blurring or graying filter overlaid on the content icon.

Where a content item is partially consumed, the content item of the second set of content items 430 may have been partially consumed (e.g., a video has been partially played) or a first portion of the content item may have been consumed and a second portion of the content item may be unconsumed. In these embodiments, the content item or the content icon represents a plurality of content items. One or more of the plurality of content items may have been consumed while other content items of the plurality of content items may be partially or wholly unconsumed. In these instances, the content icon for the partially consumed content item may be partially obscured or distinguished to indicate partial consumption. For example, a portion of the content icon may be grayscale or blurred while a remaining portion remains in an original color or image clarity state. The portion of the content icon which has been distinguished may be proportional to the amount of consumption of the partially consumed content item.

In some instances, the portion of the content item which is unconsumed remains in listed in and a part of the first set of content items 420 and the entirety of the content item (e.g., the plurality of content items) which is partially consumed is listed in and a part of the second set of content items 430. In these situations, at least a portion of the partially consumed content item occurs in both the first set of content items 420 and the second set of content items 430, and the content icon representing the partially consumed content item will appear in both the first set of content items 420 and the second set of content items 430.

In embodiments where a content item of the second set of content items 430 is wholly unconsumed, the content item is listed in and a part of both of the first set of content items 420 and the second set of content items 430. Once the wholly unconsumed content item has been consumed, the content item is then transferred to the second set of content items 430 and removed from listing and inclusion in the first set of content items 420, as described in more detail below.

In operation 320, the monitoring module 220 monitors a predetermined monitoring condition. For example, in various example embodiments, the monitoring module 220 monitors a consumption status of each of the content icons 410 of the first set of content 420. Where the monitoring condition is a consumption status, the monitoring condition may indicate whether the message content has been consumed, what portion of the message content has been consumed (e.g., an amount of a video message displayed prior to a termination of playback), a consumption number (e.g., a number of times a video message has been played), or other suitable indicators of consumption status.

Where the monitoring condition is a consumption status for a content icon 410, the content icon 410 may represent a set of message content (e.g., a plurality of individual messages received from the same content originator). In these embodiments, the consumption status may represent one or more of a selection of the content icon 410; a number, proportion, or percentage of content items of the set of content items which have been selected or displayed; a consumption number representing a number of times one or more of the content items of the set of messages represented by the content icon 410 have been consumed; or any other suitable consumption status.

The monitoring condition may be represented by a tag, bit, metadata element, or other indicator within the content item or content icon 410 or an indicator stored in data associated with the content item or content icon 410. For example, each content icon 410 may include, within data comprising the content icon 410 or in associated metadata, a consumption tag. A first value associated with the consumption tag may indicate the content icon 410 or a represented content item is unconsumed, or a portion of the content item exceeding a predetermined threshold has yet to be consumed. A second value associated with the consumption tag may indicate the content icon 410 or a represented content item is consumed, or a suitable portion, which exceeds a predetermined threshold, has been consumed. In some example embodiments, after the content icon 410 has been selected, the content item has been consumed, or a suitable portion of the content item has been consumed, the monitoring module 220 modifies the consumption tag from the first value to the second value, indicating consumption of the content item.

In various example embodiments, the monitoring module 220 monitors the user input, with respect to the graphical user interface 400, to determine whether the monitoring condition has been met. For example, the monitoring module 220 may identify positions of the content icons 410 displayed by the graphical user interface 400. When a user 106 selects a content icon 410 by selecting the content icon 410 displayed (e.g., via interaction with the touchscreen), the monitoring module 220 may identify the location of the interaction (e.g., the interaction with the touchscreen) to identify the content icon 410 selected. The monitoring module 220 may then modify the consumption status based on the interaction.

In some embodiments, the presentation module 210 generates a selection notification, upon a user 106 selecting a content icon 410 or a message represented by the content icon 410. The presentation module 210 may then pass the selection notification to the monitoring module 220, enabling the monitoring module 220 to modify the consumption status of the content icon 410. The selection notification may comprise a message packet from one module to another and including data indicating selection of the content icon 410.

After modifying the consumption status of the content icon 410, the monitoring module 220 may generate a monitoring notification. The monitoring notification indicates a change in the consumption status of the content icon 410. In various example embodiments, the monitoring notification comprises data representing the change in consumption status passed between two or more modules.

In operation 330, the access module 230 receives or otherwise accesses the monitoring notification. For example, in some example embodiments, the access module 230 receives the consumption notification for a content item of the first set of content 420 from the monitoring module 220. In various example embodiments, the access module 230 may periodically query the monitoring module 220 for monitoring notifications. For example, a user input on the touchscreen of the client device 110 may trigger the access module 230 to query the monitoring module 220 to determine if one or more monitoring notifications have been generated. In some embodiments, where the monitoring module 220 modifies the consumption status of the content icon 410 but does not generate a separate monitoring notification, the access module 230 may be triggered to access the data representing the content icons 410 included in the first set of content 420 to identify one or more of the content icons 410 which have a change in consumption status.

In various example embodiments, after accessing or otherwise receiving the monitoring notification indicative of a change in consumption status of one or more content icons 410, the access module 230 may pass data, representing an indication of the change in consumption status, to the organization module 240.

In operation 340, the organization module 240 transfers the content item to the second set of content 430. For example, in some embodiments, in response to receiving the consumption notification in operation 330, the organization module 240 automatically transfers the content item from the first set of content 420 to the second set of content 430. In transferring the content item from the first set of content 420 to the second set of content 430, the organization module 240 may perform one or more sub-operations. In at least some embodiments, automatically transferring the content item may be automatic in that the organization module 240, upon receiving the consumption notification, performs one or more operations to transfer the content item to the second set of content 430 without further user interaction with the graphical user interface 400 or the client device 110.

In various example embodiments, transferring the content item is performed by associating the content item with the second set of content 430. Based on the association of the content item with the second set of content 430, the organization module 240 organizes the content item within the second set of content 430 according to the second order. For example, the content item (e.g., represented by the content icon 410) may have one or more order values as part of the data comprising the content item or metadata associated with the content item. The organization module 240 may modify the one or more order values to indicate an order and a placement position within the order. In some instances, the order may be selected from a predetermined set of order schemes.

In operation 350, the presentation module 210 causes presentation of the content item as a part of the second set of content 430 within the graphical user interface 400, placing the content icon 410 representing the content item within the list or table of the second set of content 430. For example, the presentation module 210 may cause the content icon 410 for the content item to be positioned within a list view of the second set of content 430 when the content icon 410 is positioned out of the viewable area of the graphical user interface 400 (e.g., the user 106 scrolls down past the content item). In some instances, the presentation module 210 applies an animation to remove the content icon 410 of the content item from the first set of content 420. For example, the presentation module 210 may cause the content icon 410 to disappear from the first set of content 420 using transition such as a wipe, a fade out, an iris, or a radial wipe (e.g., performing a wipe of the content icon 410 in a clockwise motion similar to the sweeping hand of a clock), or any suitable transition. In some embodiments, the presentation module 210 may cause the content icon 410 to move down the list of the first set of content 420 and the second set of content 430 to a new position within the second set of content 430. In these instances, the presentation module 210 may follow the movement of the content icon 410 and then dynamically reposition the graphical user interface 400 back to a previous position, depicting a portion of the remaining first set of content 420.

Figure 5:
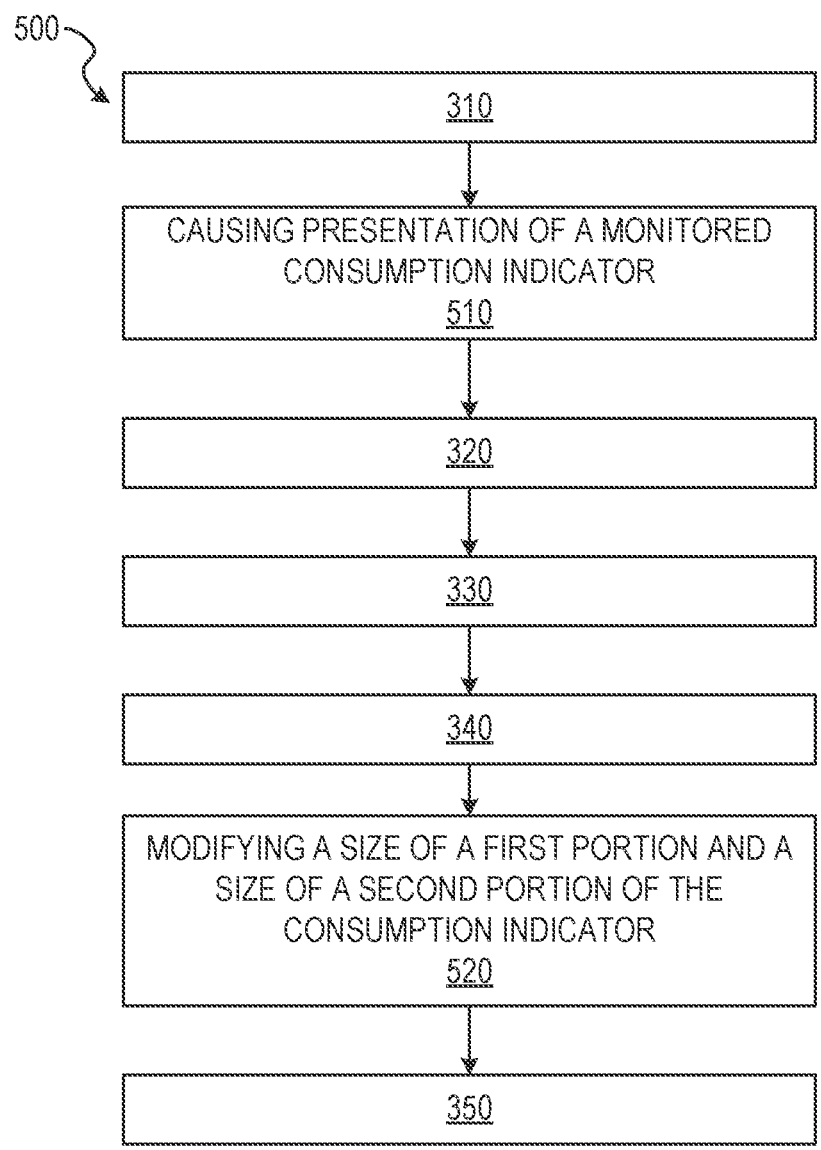
FIG. 5 is a flow diagram illustrating an example method for monitoring and dynamically modifying presentation of communication data within a graphical user interface, according to some example embodiments.

FIG. 5 shows a flow diagram illustrating an example method 500 for monitoring and dynamically modifying presentation of communication data, and representations thereof, within a graphical user interface 400 based on one or more monitored conditions. The operations of method 500 may be performed by components of the communications monitoring system 160. In some instances, certain operations of the method 500 may be performed using one or more operations of the method 300 or as sub-operations of one or more operations of the method 300, as will be explained in more detail below.

Figure 6:
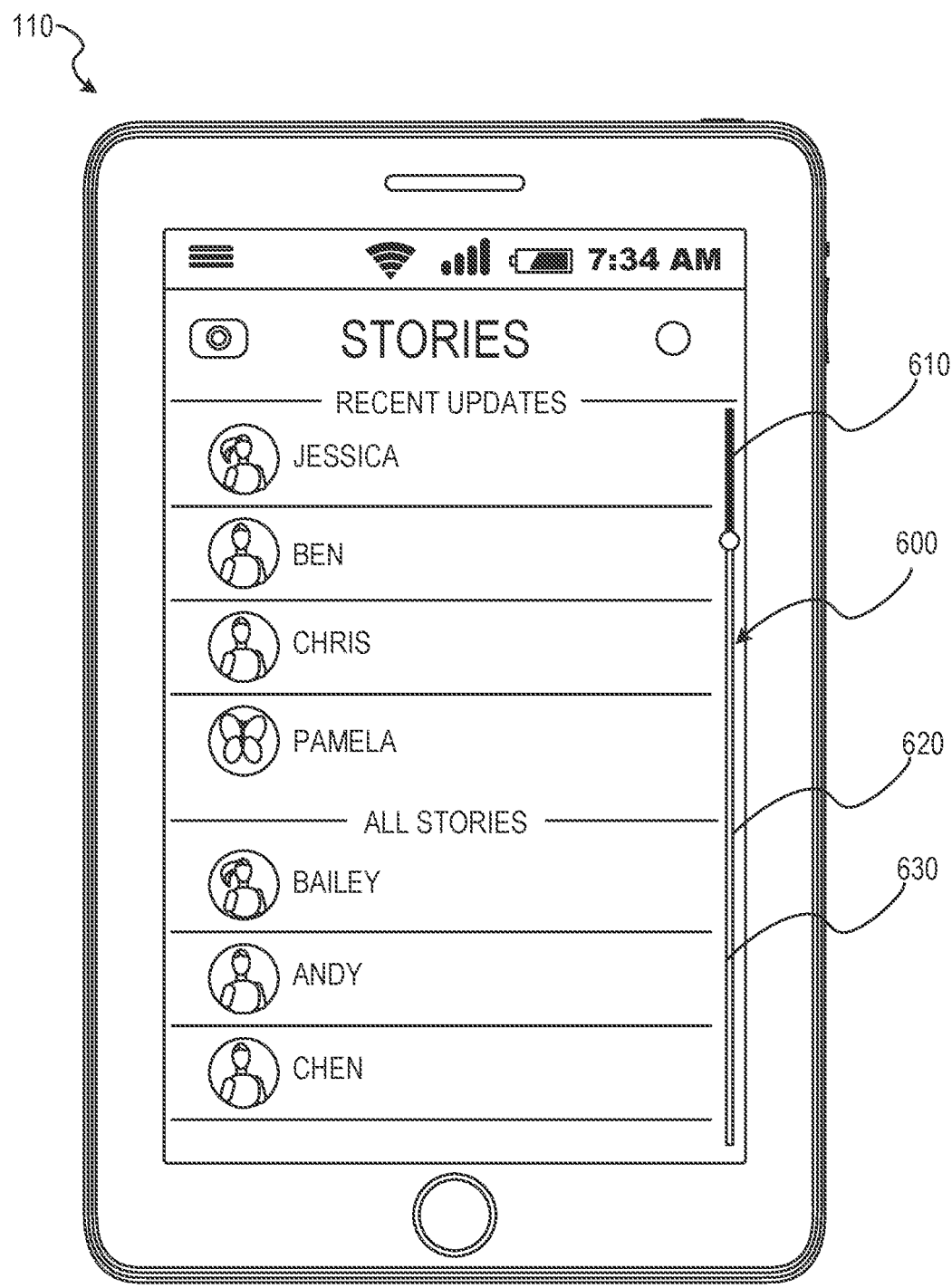
FIG. 6 illustrates an example presentation of communication data within a graphical user interface, according to some example embodiments.

In operation 510, the presentation module 210 causes presentation of a monitored condition indicator. In various example embodiments, as shown in FIG. 6, the monitored condition indicator is a consumption indicator 600 with a first portion 610 and a second portion 620 distinct from the first portion 610. As shown in FIG. 6, the first portion 610 represents unconsumed content items and the second portion 620 represents consumed content items. In some embodiments, the consumption indicator 600 is displayed as a track 630 for a scroll bar. The first portion 610 of the track 630 is presented as a first color and the second portion 620 of the track 630 is presented as a second color distinct from the first color. For example, the first portion 610 may be purple in color and the second portion 620 may be gray in color to represent the distinction between unconsumed items and consumed items.

The icon module 250 initially sizes the first portion 610 of the consumption indicator 600 proportionately to the first set of content icons 420 (e.g., the unconsumed content items) when presenting the graphical user interface 400. For example, when a communication application is opened after closing a previous communication session, the communications monitoring system 160 may determine an existence of one or more unconsumed content items (e.g., the first set of content icons 420). The icon module 250 determines a number of unconsumed content items with respect to a total number of consumed and unconsumed content items (e.g., a total set of content items). The icon module 250 determines a display space suitable to display the total number of consumed and unconsumed content items, and generates the consumption indicator 600 such that the first portion 610 of the consumption indicator 600 represents the proportion of content items, of the total number of content items, which are currently unconsumed. For example, where a total number of content items is ten, and comprises one unconsumed content item and nine consumed content item, the first portion 610 of the consumption indicator 600 may be one tenth of the area (e.g., a length) of the consumption indicator 600 and the second portion 620 may be nine tenths of the area of the consumption indicator 600.

The presentation module 210 may the cause display of the consumption indicator 600 generated by the icon module 250. As a result of the proportionate display of the first portion 610 of the consumption indicator 600, or in addition to the proportionate display, the icon module 250 may initially size the second portion 620 of the consumption indicator 600 proportionately to the consumed content items and modify the size of the second portion 620 based on successive consumption of unconsumed content items. In some example embodiments, the second portion 620 may represent the track 630 of the scroll bar, acting as a background color. In these embodiments, the icon module 250 generates the first portion 610 of the consumption indicator 600 as an overlay color, visibly presented over at least a portion of the second portion 620.

In operation 520, the icon module 250 automatically modifies a size of the first portion 610 and a size of the second portion 620 in response to receiving the consumption notification in the operation 330. In various embodiments, to automatically modify the size of at least one of the first portion 610 and the second portion 620, the icon module 250 may perform one or more operations upon receipt of the consumption notification. In some of these embodiments, the icon module 250 modifies the first portion 610 with respect to the second portion 620 of the consumption indicator 600. The icon module 250 may reduce a length of the first portion 610 of the consumption indicator 600 and increase a length of the second portion 620 in proportion to a number of content items consumed, as indicated by the consumption notification. In some embodiments, modification of the first portion 610 automatically causes modification of the second portion 620, such as instances where the first portion 610 is an overlay presented over the second portion 620.

In modifying the first portion 610, the icon module 250 may perform operations on data representing the first portion 610 and the second portion 620 or operations on metadata representing the same. The icon module 250 may change one or more values (e.g., values for length, color, and area) of the first portion 610 and the second portion 620 of the consumption indicator 600 based on one or more values included in the consumption notification. In these embodiments, the consumption notification may include a value indicating a decrement of a number of unconsumed content items. The icon module 250 may decrement a length value of the first portion 610 based on the decremented value in the consumption notification and increment a length value of the second portion 620 based on the value of the consumption notification. In various embodiments, modification of the first portion 610 and the second portion 620 are simultaneous operations.

Although described with respect to size (e.g., length), it should be understood that any suitable differentiating value of the consumption indicator 600 may be modified with respect to the proportion of consumed and unconsumed content items. In some embodiments, the first portion 610 is modifiable across a plurality of colors. Each color may be identified with an upper and lower threshold value corresponding to a number of unconsumed content items. The icon module 250 may automatically modify the color of the first portion 610 to reflect the number of remaining unconsumed content items. In some embodiments, a hue or intensity may be modified by the icon module 250 representative of changes in the number of unconsumed content items.

Figure 7:
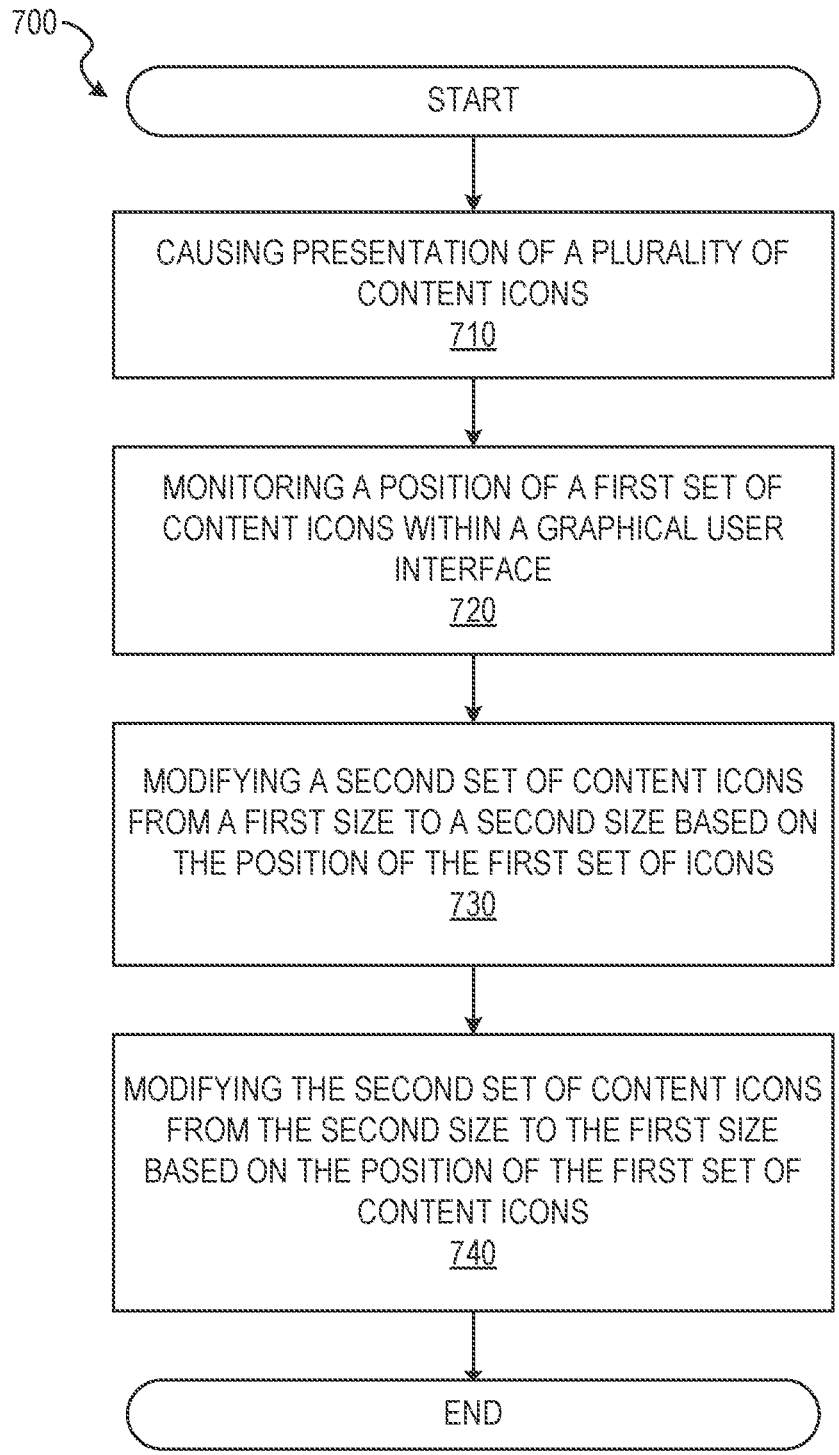
FIG. 7 is a flow diagram illustrating an example method for monitoring and dynamically modifying presentation of communication data within a graphical user interface, according to some example embodiments.

FIG. 7 depicts a flow diagram illustrating an example method 700 of modifying representations of communication data within a graphical user interface 800 using the communications monitoring system 160. The operations of method 700 may be performed by components of the communications monitoring system 160. In some instances, certain operations of the method 700 may be performed using one or more operations of the methods 300 or 500, in one or more of the described embodiments, or as sub-operations of one or more operations of the methods 300 or 500, as will be explained in more detail below.

Figure 8:
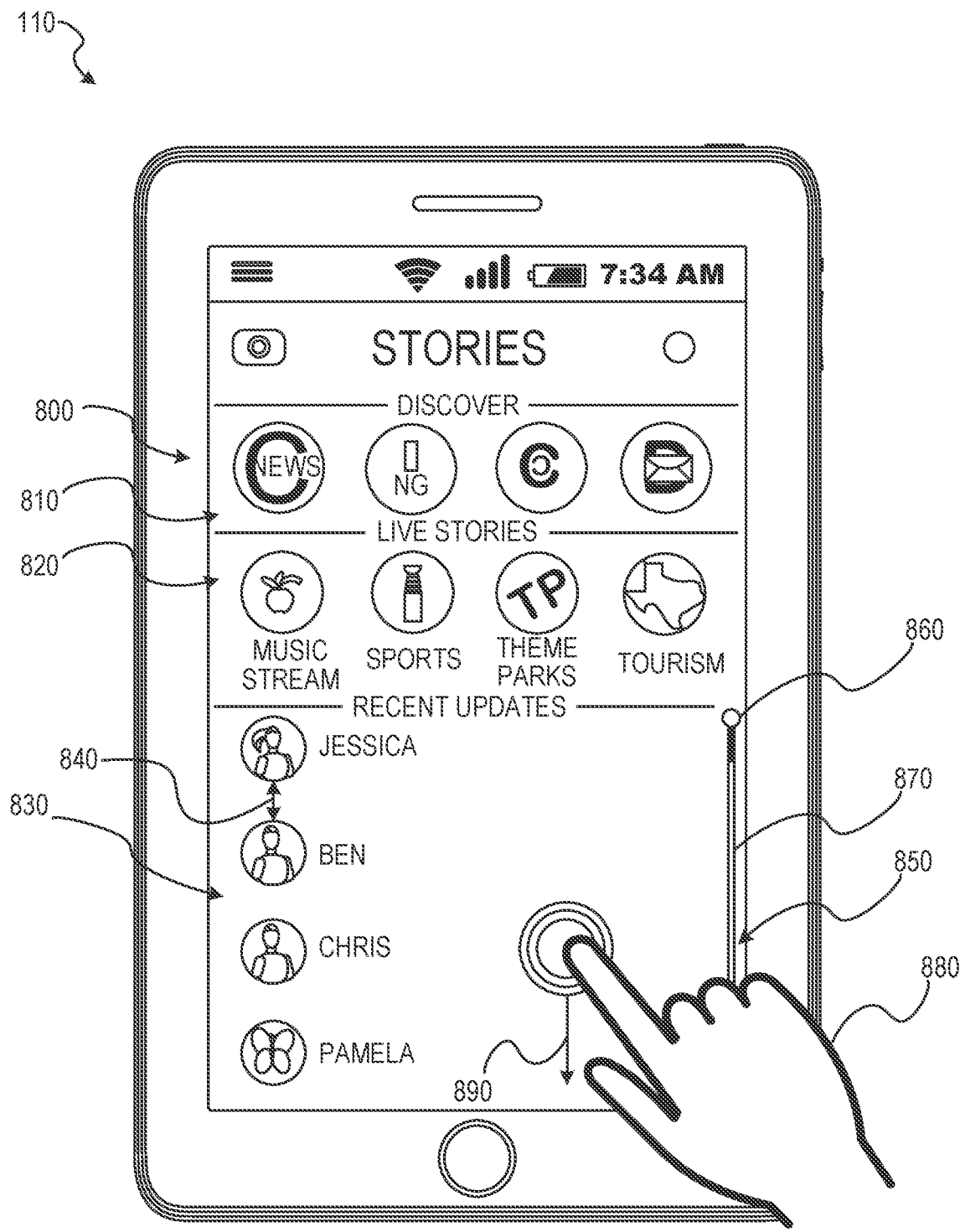
FIG. 8 illustrates an example user interaction to cause a change in presentation of communication data, according to some example embodiments.

In operation 710, the presentation module 210 causes presentation of a plurality of content icons 810 within a graphical user interface 800 on a screen of the client device 110, as shown in FIG. 8. In some embodiments, the plurality of content icons 810 comprises a first set of content icons 820 and a second set of content icons 830. The second set of content icons 830 may be presented at a first size. The first size of the second set of content icons 830 may be dynamically determined. For example, the first size may be a percentage of a display size of the client device 110.

In various example embodiments, the first size is a size such that text included in an icon of the second set of content icons 830 or text associated with one or more of the second set of content icons 830 is above a predetermined text size. Further, in some example embodiments, the first size is a size proportioned to enable a predetermined number of content icons 810 of the second set of content icons 830 to appear within the graphical user interface 800 simultaneously with the first set of content icons 820. For example, the first size may be determined based on a predetermined spacing 840 between any two of the second set of content icons 830, a predetermined font spacing, a predetermined screen size of the client device 110, or any other suitable factor which may be combined with the first size to determine a number of displayable content icons 810 of the second set of content icons 830.

In operation 720, the monitoring module 220 monitors a position of the first set of content icons 820 within the graphical user interface 800 on the screen of the client device 110. The monitoring module 220 may monitor the position of the first set of content icons 820 based on a position of one or more of the first set of content icons 820 in relation to an edge of the screen of the client device 110. In various example embodiments, the monitoring module 220 may monitor the position of the first set of content icons 820 based on a consumption indicator 850 (e.g., a slider 860 position of a scroll bar 870) configured to navigate among the first set of content icons 820 and the second set of content icons 830. Although discussed with reference to screen positions of the first set of content icons 820 and the slider 860 of the scroll bar 870, the monitoring module 220 may monitor the position of the first set of content icons 820 by any suitable method or combination of methods.

Figure 9:
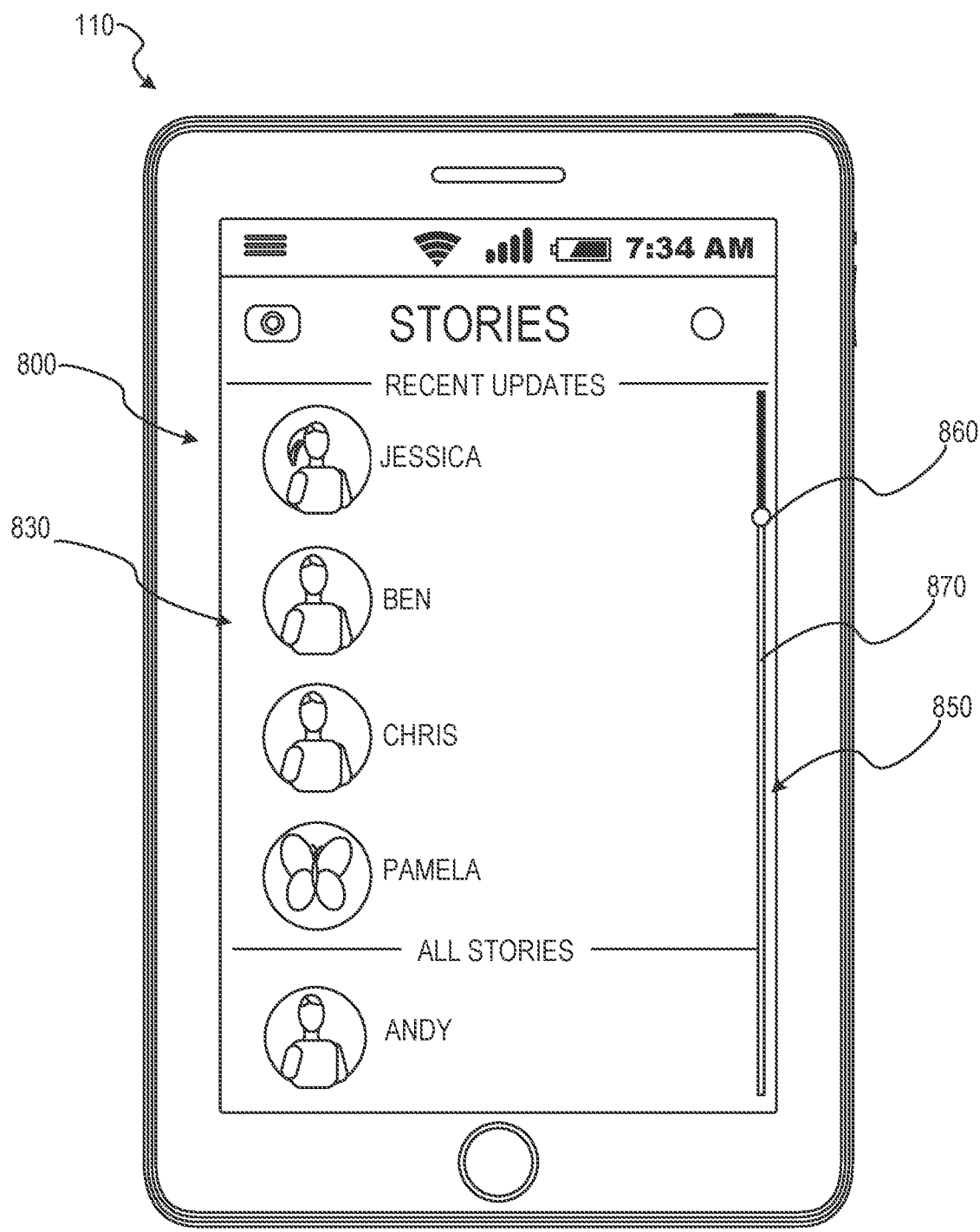
FIG. 9 illustrates an example user interaction to cause a change in presentation of communication data, according to some example embodiments.

In operation 730, the icon module 250 modifies the second set of content icons 830 from the first size to a second size, as shown in FIG. 9. In various example embodiments, the icon module 250 automatically modifies the second set of content icons 830 where the first set of content icons 820 are no longer viewable in the graphical user interface 800 on the screen of the client device 110. For example, when a user 106 interacts with a touchscreen (e.g., using a hand 880) to move the slider 860 to a position beyond which the first set of content icons 820 are displayed (e.g., in a downward motion 890), the icon module 250 may modify the second set of content icons 830 by changing a value of the second set of content icons 830 from a first size to the second size.

For example, the icon module 250 may change a measurement of the content icons 810 (e.g., a measurement in inches or millimeters), a font value, a pixel value, or any other value representative of the size of the second set of content icons 830.

In various embodiments, the operation 730 is performed in response to a precursor operation. For example, the operation 730 may be performed in response to the access module 230 receiving a user input causing a change in position of the first set of content icons 820. The user input may be a selection initiating the change in position, such as a user 106 touching the touchscreen of the client device 110 and dragging a finger in a direction while maintaining contact with the touchscreen. The user input is released once the first set of content icons 820 are no longer viewable in the graphical user interface 800, triggering the icon module 250 to modify the second set of content icons 830 in the operation 730. In various embodiments, until the user interaction ceases (e.g., the user 106 removes a finger from contact with the touchscreen), the icon module 250 is not triggered to modify the size of the second set of content icons 830.

In some instances, in the operation 730, the icon module 250 modifies the consumption indicator 850 based on one or more of the position of the first set of content icons 820 and the position of the second set of content icons 830. As shown in FIGS. 8 and 9, the icon module 250 modifies the consumption indicator 850 by increasing a length of the scroll bar 870 of the consumption indicator 850. For example, the consumption indicator 850 may be modified from a first length extending a distance equal to a first screen length used to display the second set of content icons 830, in FIG. 8, to a second length equal to a second screen length used to display the second set of content icons 830 after the content icons 810 have been modified and repositioned in operation 730. In various embodiments, the modification of the consumption indicator 850 is performed in response to the release of the user input causing modification of the second set of content icons 830 and the consumption indicator 850.

In operation 740, the icon module 250 modifies the second set of content icons 830 from the second size to the first size upon the first set of content icons 820 returning to a viewable position on the graphical user interface 800 on the screen of the client device 110. In some embodiments, the icon module 250 modifies the second set of content icons 830 to revert to the first size automatically as the first set of content icons 820 return to the viewable position. In various instances, the icon module 250 is not triggered to modify the size of the second set of content icons 830 until the user interaction ceases which caused the first set of content icons 820 to return to the viewable position. For example, while the user 160 maintains contact with the touchscreen and is engaged in scrolling, the icon module 250 may not be triggered. Upon release of contact with the touchscreen, the icon module 250 may automatically perform the resizing operations.

Figure 10:
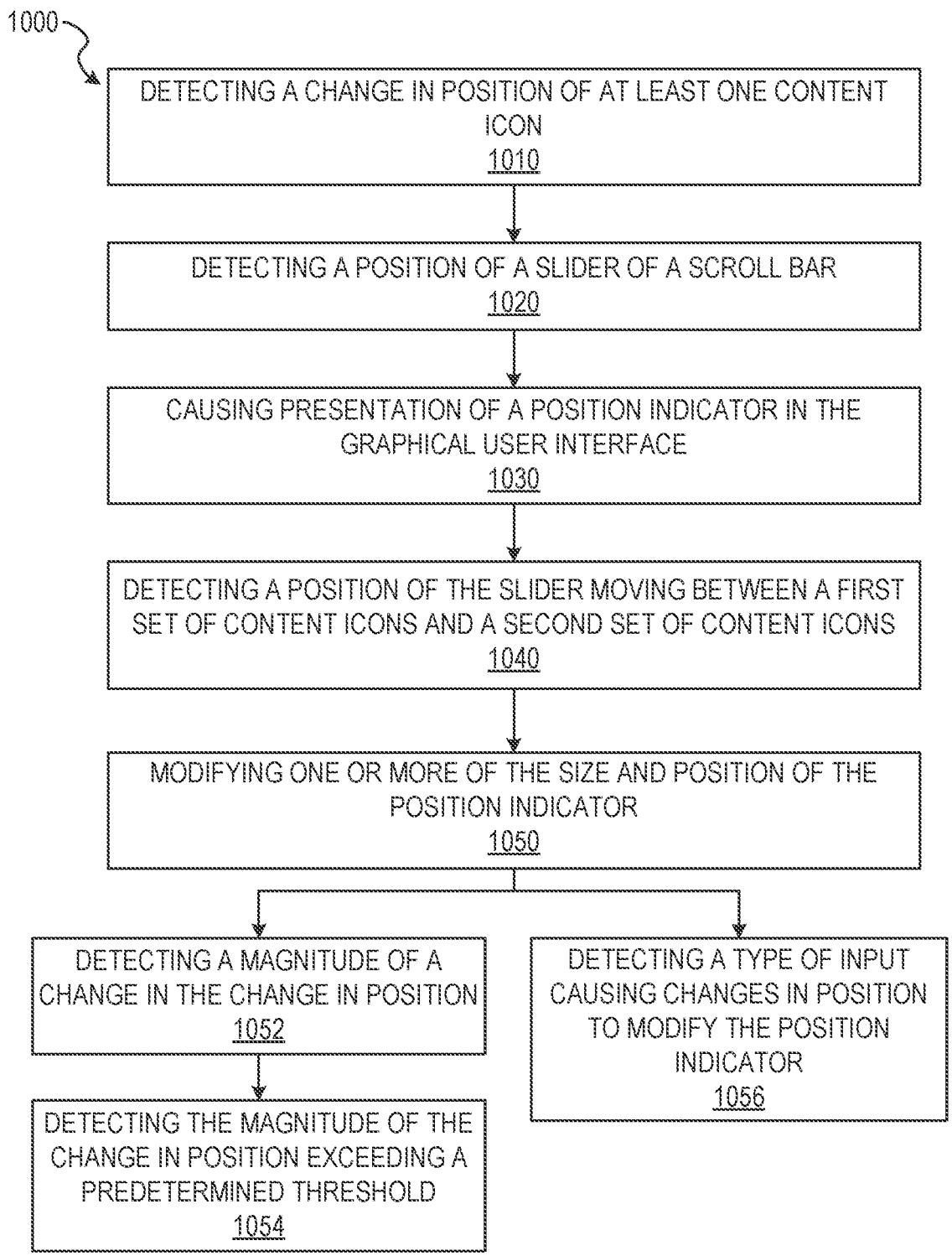
FIG. 10 is a flow diagram illustrating an example method for monitoring and dynamically modifying presentation of communication data within a graphical user interface, according to some example embodiments.

FIG. 10 depicts a flow diagram illustrating an example method 1000 for monitoring and dynamically modifying presentation of communication data, and representations thereof, within a graphical user interface 1130 based on one or more monitored conditions. The operations of method 1000 may be performed by components of the communications monitoring system 160. In some instances, certain operations of the method 1000 may be performed using one or more operations of the methods 300, 500, or 700, in one or more of the described embodiments, or as sub-operations of one or more operations of the methods 300, 500, or 700, as will be explained in more detail below.

Figure 11A:
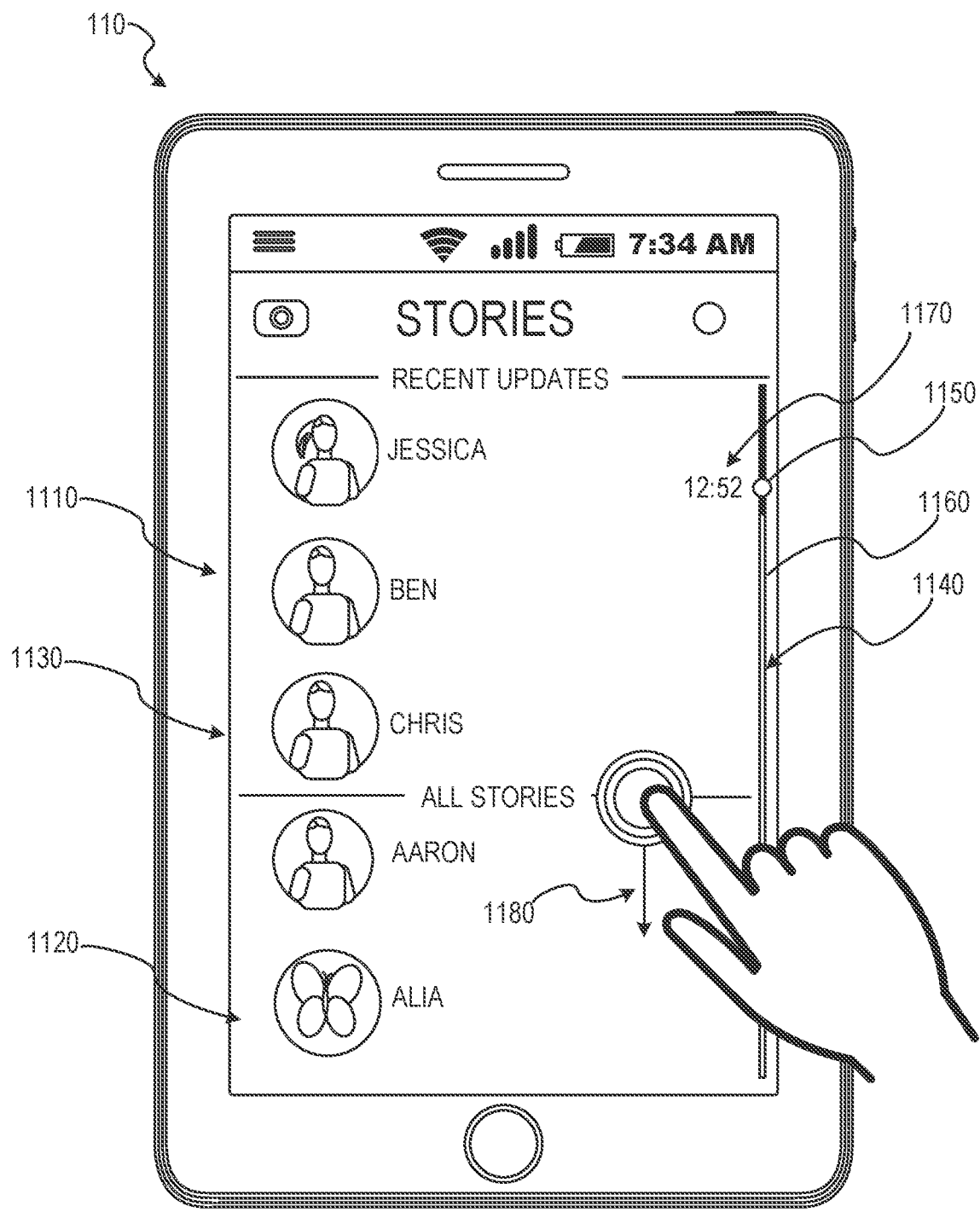
FIG. 11A illustrates an example user interaction to cause a change in presentation of communication data, according to some example embodiments.
Figure 11B:
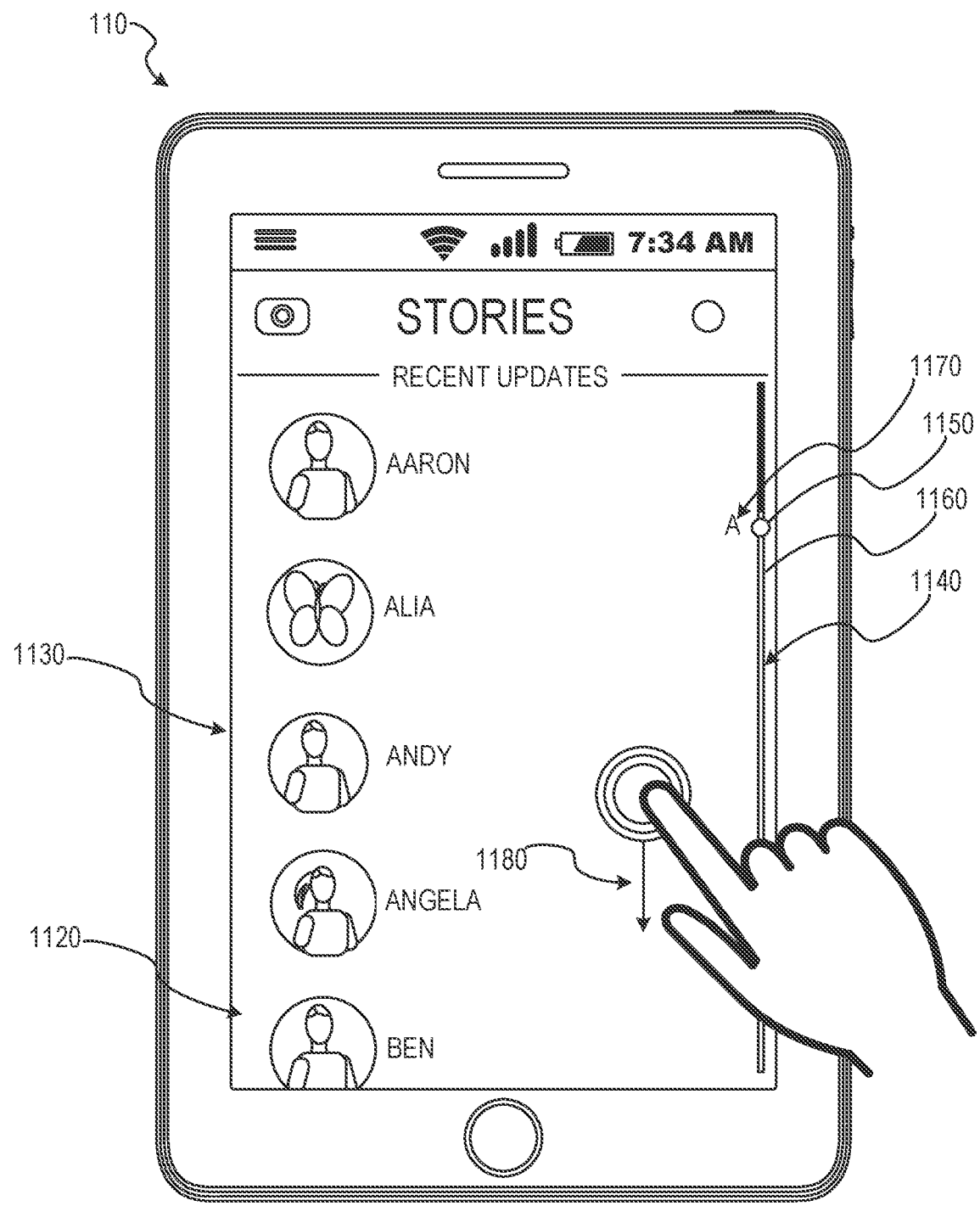
FIG. 11B illustrates an example user interaction to cause a change in presentation of communication data, according to some example embodiments.

In operation 1010, monitoring module 220 detects a change in position of at least one of the first set of content icons 1110 and the second set of content icons 1120, as shown in FIGS. 11A and 11B. In various example embodiments, the monitoring module 220 detects the change in position by tracking an input received by the client device 110. For example, the monitoring module 220 may detect the change in position based on a selection and position change of a pointer controlled by an input device, such as a mouse. By way of further example, the monitoring module 220 may detect the change in position based on a selection and position change due to an interaction of a user 106 with a touchscreen of the client device 110. Regardless of the input method resulting in the change in position, the monitoring module 220 may determine whether the change in position is due to an interaction generally with a graphical user interface 1130 or specifically with a consumption indicator 1140.

In various embodiments, during the pendency of the change in position, in operation 1020, the monitoring module 220 detects a position of a slider 1150 of a scroll bar 1160. The monitoring module 220 may detect the position of the slider 1150 based on a displayed pixel value, a position value being adjusted during the change in position, or any other suitable method.

In operation 1030, the presentation module 210 causes presentation of a position indicator 1170 in the graphical user interface 1130. The position indicator 1170, as shown in FIGS. 11A and 11B, is presented to the left of the slider 1150. The position indicator 1170 represents a position within the order of one or more of the first set of content icons 1110 and the second set of content icons 1120 being displayed. The position indicator 1170 may be an alphanumeric indication of a position within an order. In some embodiments, where a set of content icons 810 (e.g., the first set of content icons 1110) are ordered according to a time at which each of the content items represented by the content icons were received, the position indicator 1170 may be a time, a measure of time (e.g., how long ago a content item was received), or any other suitable indication of time. In embodiments, where a set of content icons (e.g., the second set of content icons 1120) are ordered according to an identity of a content originator, the position indicator 1170 may be a letter, set of letters, or other indication of identities.

In various embodiments, in operation 1040, while the consumption indicator 1140 is being moved (e.g., in a downward direction 1180), the monitoring module 220 detects the position of the slider 1150 of the scroll bar 1160 moving between the first set of content icons 1110 and the second set of content icons 1120. In some embodiments, the monitoring module 220 automatically detects the position of the slider 1150 within the order of the second set of content icons 1120. The consumption indicator 1140 may include a position value indicating the position of the consumption indicator 1140 (e.g., the position of the slider 1150). The first set of content icons 1110 and the second set of content icons 1120 may include position values corresponding to a position delineating the first set of content icons 1110 from the second set of content icons 1120. When the position value of the consumption indicator 1140 exceeds the position value delineating the first set of content icons 1110 from the second set of content icons 1120, the monitoring module 220 may detect the position of the slider 1150 as being within the second order of the second set of content icons 1120. The monitoring module 220 may detect the slider 1150 (e.g., the consumption indicator 1140) crossing a boundary between the first set of content icons 1110 and the second set of content icons 1120 by comparing the position value of the consumption indicator 1140 to the position value delineating the sets of content icons. In some embodiments, when the slider 1150 (e.g., the consumption indicator 1140) begins to move in response to a user input for the graphical user interface 1130, the monitoring module 220 is triggered to monitor the position value for the slider 1150 or receive changes in the value.

Where two or more differing ordering schemes are used for differing sets of content icons (e.g., a first order used for the first set of content icons 1110 and a second order used for the second set of content icons 1120), the presentation module 210 may automatically cause the position indicator 1170 to represent a first order with an appropriate indication (e.g., a time measure) when the consumption indicator 1140 is within a set of content icons organized by the first order and represent a second order with an appropriate indication (e.g., a letter) when the consumption indicator 1140 is within a set of content icons organized by the second order.

In operation 1050, while the consumption indicator 1140 is being moved, presentation module 210 modifies one or more of the size and the position of the position indicator 1170. In some instances, the monitoring module 220 detects a magnitude of changes in position of user interface elements or types of input causing changes in position in order to modify one or more of the size and the position of the position indicator 1170. In various embodiments, the operation 1050 is performed by one or more sub-operations, described in more detail below.

In various embodiments, where the presentation module 210 modifies the size or position of the position indicator 1170 based on a magnitude of changes in position, in operation 1052, the monitoring module 220 detects a magnitude of the change in position of one or more user interface elements on the graphical user interface 1130. In some instances, the monitoring module 220 detects a magnitude of the change in position of at least one content icon (e.g., a user interface element) of the first set of content icons 1110 and the second set of content icons 1120. In some instances, the monitoring module 220 detects a magnitude of change in the slider 1150. In detecting the magnitude of the change in position, the monitoring module 220 determines a value for the magnitude of the change in position.

In operation 1054, the monitoring module 220 detects the magnitude of the change in position of the user interface element as exceeding a predetermined threshold. In various embodiments, the monitoring module 220 compares the value of the magnitude of the change in position with the predetermined threshold to determine if the value is greater than the predetermined threshold. In some instances, the predetermined threshold is a distance the one or more user interface element traverse on the screen of the client device 110 as depicted on the graphical user interface 1130. In these embodiments, where the magnitude of the change in position is less than the predetermined threshold, the position indicator 1170 is presented at a first size and a first distance (e.g., a placement of the position indicator 1170) from the slider 1150. For example, the position indicator 1170 may be presented sixty points from the slider 1150 and at a twelve point font size. Where the magnitude of the change in position is greater than the predetermined threshold, the presentation module 210 presents the position indicator 1170 at a second size and a second distance from the slider

1150. For example, the position indicator 1170 may be presented one hundred points from the slider 1150 and at an eighteen point font size.

In operation 1056, the monitoring module 220 detects a type of input causing changes in position in order to modify one or more of the size and the position of the position indicator 1170. In these embodiments, the monitoring module 220 detects whether the input interacts with the consumption indicator 1140 (e.g., the slider 1150). In various embodiments, where the monitoring module 220 detects the input is not interacting with the consumption indicator 1140, the presentation module 210 presents the position indicator 1170 at one or more of a first size and a first distance from the slider 1150. Where the monitoring module 220 detects the input is interacting with the consumption indicator 1140 (e.g., the slider 1150), the presentation module 210 presents the position indicator 1170 at one or more of a second size and a second distance from the slider 1150.

In some instances, the monitoring module 220 applies differing weights to changes in position based on where the change in position is detected within the graphical user interface 1130. When detecting an input within the graphical user interface 1130 not interacting with the consumption indicator 1140, the monitoring module 220 applies a first weight to the magnitude of the change in position. When detecting an input associated with the consumption indicator 1140, the monitoring module 220 applies a second weight to the magnitude of the change in position. For example, the first weight may be equal to one, indicating a user 106 dragging the table of content icons and providing a change in position equal to the distance of the input (e.g., the distance a finger was dragged along a touchscreen). The second weight may be greater than one, indicating the user 106 is scrolling using the consumption indicator 1140.

In some embodiments, scrolling with the consumption indicator 1140 causes a greater change in position of the first set of content icons 1110 and the second set of content icons 1120 for a given distance of an input of the user 106. For example, where the user 106 moves a finger across the touchscreen of the client device 110, the change in position is greater than the distance the finger was dragged, resulting in the magnitude of the change in position traversing a greater distance than attributed to dragging of the finger.

In these embodiments, where the magnitude of the change in position (e.g., the change in position adjusted by the first weight or the second weight) is less than the predetermined threshold, the position indicator 1170 is presented as one or more of a first size and a first distance from the slider 1150. Where the magnitude of the change in position is greater than the predetermined threshold, the presentation module 210 presents the position indicator 1170 as one or more of a second size and a second distance from the slider 1150.

Figure 12:
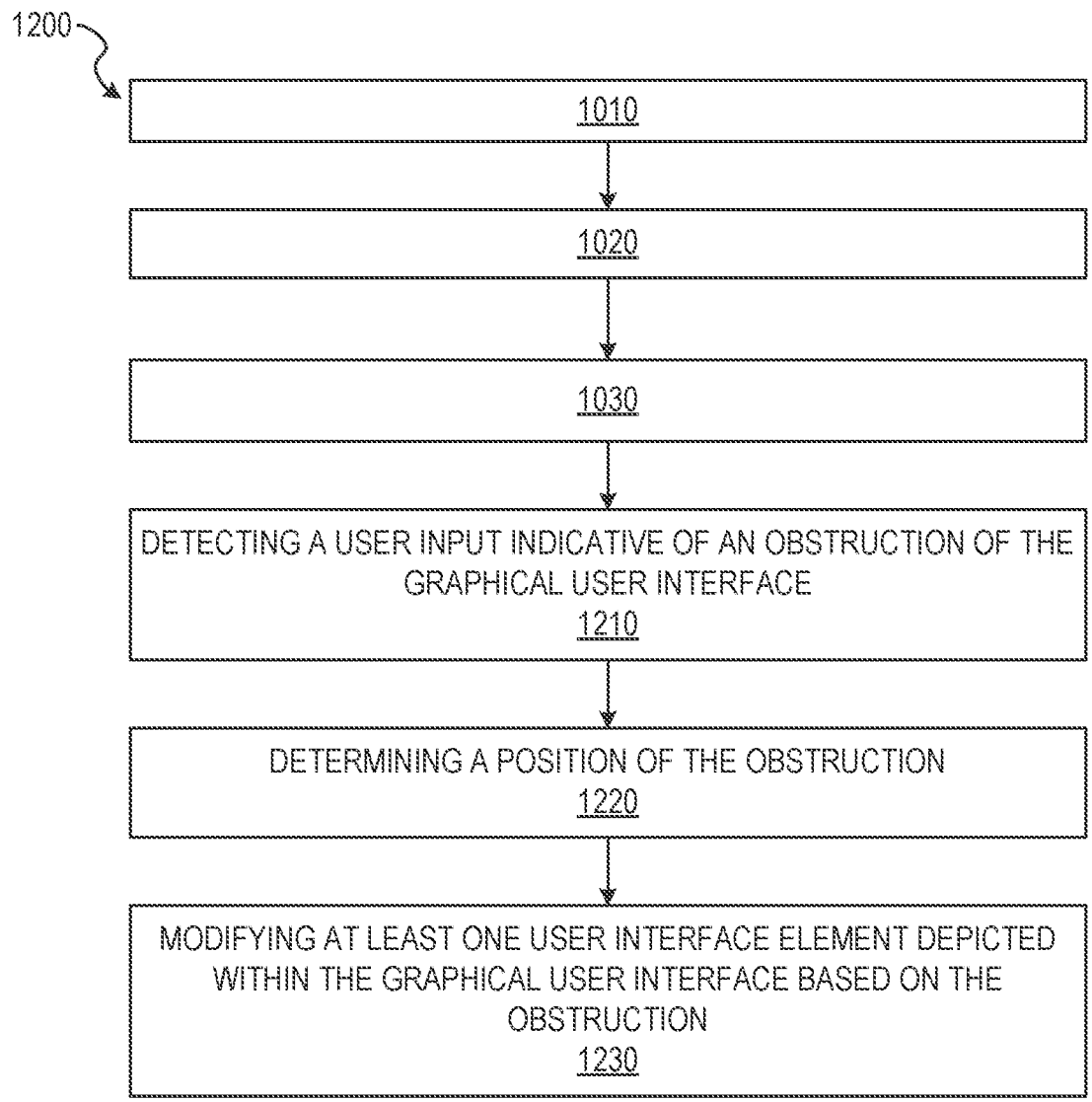
FIG. 12 is a flow diagram illustrating an example method for monitoring and dynamically modifying presentation of communication data within a graphical user interface, according to some example embodiments.

FIG. 12 depicts a flow diagram illustrating an example method 1200 for controlling one or more operations of the client device 110 via one or more functions of the communications monitoring system 160. The operations of method 1200 may be performed by components of the communications monitoring system 160. In some instances, certain operations of the method 1200 may be performed using one or more operations of the methods 300, 500, 700, or 1000, in one or more of the described embodiments, or as sub-operations of one or more operations of the methods 300, 500, 700, or 1000, as will be explained in more detail below.

Figure 13:
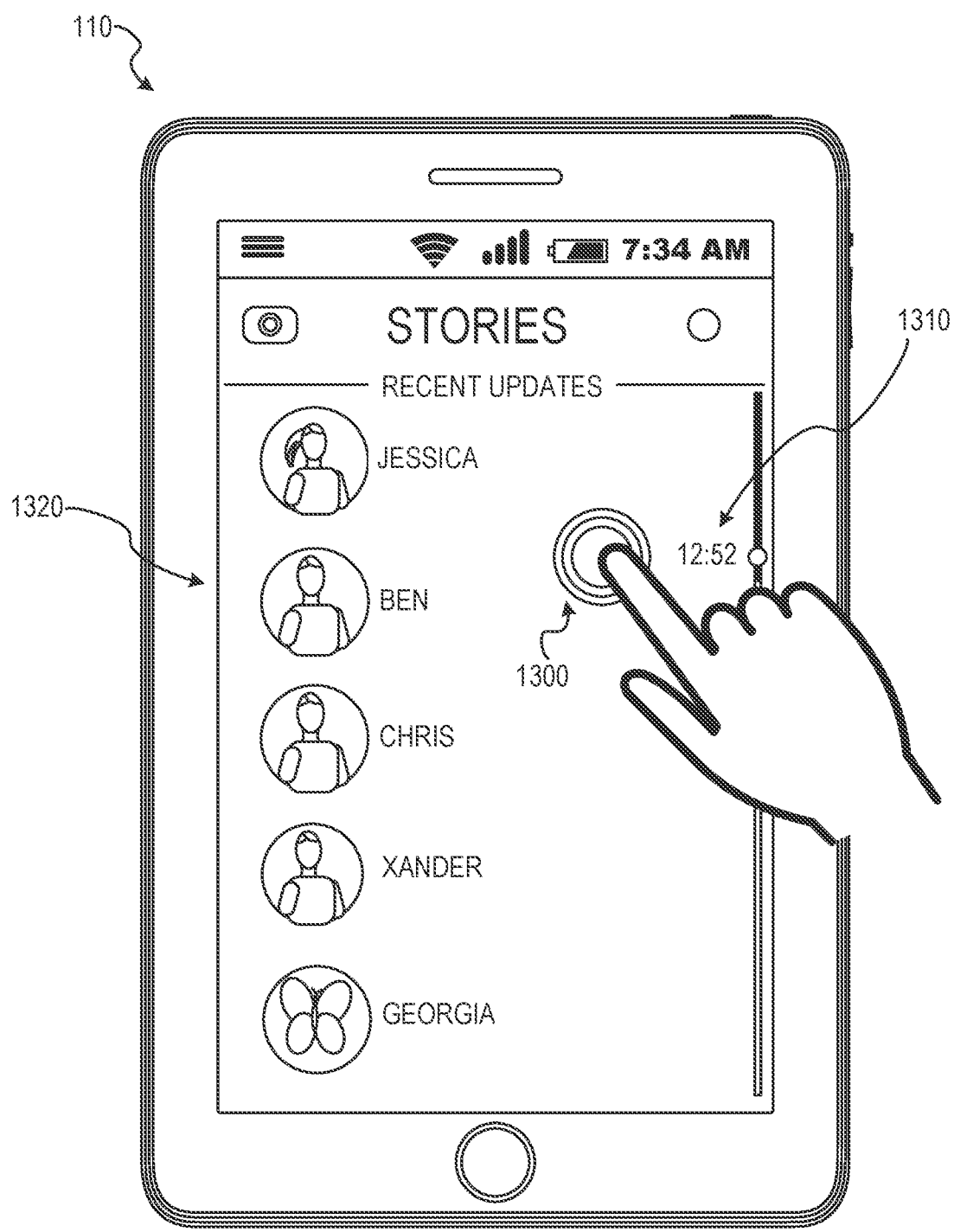
FIG. 13 illustrates an example user interaction to cause a change in presentation of communication data, according to some example embodiments.
Figure 14:
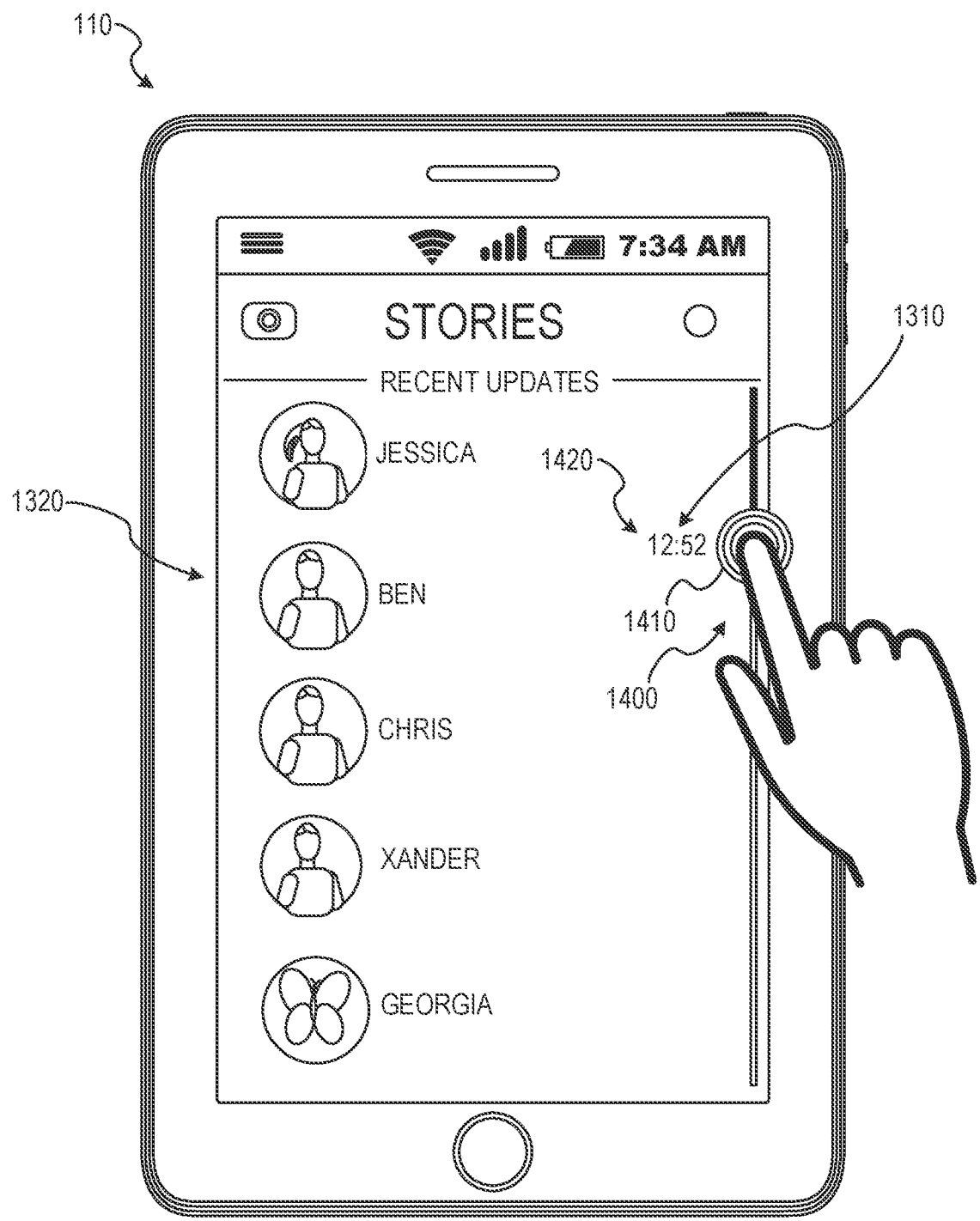
FIG. 14 illustrates an example user interaction to cause a change in presentation of communication data, according to some example embodiments.

In operation 1210, the monitoring module 220 detects a user input indicative of an obstruction of the graphical user interface 1320, as shown in FIGS. 13 and 14. For example, in some embodiments, the monitoring module 220 detects a first contact (e.g., user input 1300) with a touchscreen of the client device 110. The presentation module 210 may cause presentation of a user interface element (e.g., a position indicator 1310) on the graphical user interface 1320. As shown in FIG. 14, the monitoring module 220 may then detect a second contact (e.g., user input 1400) obstructing a portion of the screen (e.g., represented by obstruction 1410) on which the graphical user interface 1320 is displayed. The user input 1300, 1400 may be detected by an interaction between the monitoring module 220 and a user input device, such as a touchscreen. In various embodiments, the monitoring module 220 is configured to actively monitor or receive indications of user input 1300, 1400 from the user input device, such as a packet originating in the user input device hardware or firmware indicating initiation of user input 1300, 1400 employing the user input device.

In operation 1220, the monitoring module 220 determines a position of the obstruction 1410. The monitoring module 220 may determine the position based on a value or set of values representing an area and position of the obstruction 1410 (e.g., a number and position of pixels used to display an arrow icon representing a mouse or a number and position of pixels of a touchscreen obscured by a finger) received from the user input device or from one or more module, software element, or firmware element interpreting signals received from the user input device.

In operation 1230, the icon module 250 modifies at least one user interface element depicted within the graphical user interface 1320, based on the position of the obstruction 1410. The icon module 250 may modify the user interface element to cause presentation of the user interface element at a position on the touchscreen which is not covered, blocked, or otherwise obfuscated by the obstruction 1410. For example, as shown in FIGS. 13 and 14, in some embodiments, the icon module 250 modifies a placement of the position indicator 1310 on a graphical user interface 1320 displayed on the touchscreen of the client device 110. As shown in FIG. 13, the presentation module 210 may initially present the position indicator 1310 in response to a user input 1300, such as scrolling the displayed user interface elements (e.g., content icons). When the user input 1300 changes from a first contact to a second contact (e.g., user input 1400), obscuring or obstructing the position indicator 1310, one or more of the icon module 250 and the presentation module 210 cause presentation of the position indicator 1310 at an unobstructed position 1420.

Modules, Components, and Logic

Certain embodiments are described herein as including logic or a number of components, modules, or mechanisms. Modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, computer systems (e.g., a standalone computer system, a client computer system, or a server computer system) or hardware modules of a computer system (e.g., at least one hardware processor, a processor, or a group of processors) is configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a field-programmable gate array (FPGA) or an application specific integrated circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by processors that are temporarily configured (e.g., by software) or permanently configured to perform the relevant operations. Whether temporarily or permanently configured, such processors constitute processor-implemented modules that operate to perform operations or functions described herein. As used herein, "processor-implemented module" refers to a hardware module implemented using processors.

Similarly, the methods described herein can be at least partially processor-implemented, with a particular processor or processors being an example of hardware. For example, at least some of the operations of a method can be performed by processors or processor-implemented modules. Moreover, the processors may also operate to support performance of the relevant operations in a "cloud computing" environment or as a "software as a service" (SaaS). For example, at least some of the operations may be performed by a group of computers (as examples of machines including processors), with these operations being accessible via a network 104 (e.g., the Internet) and via appropriate interfaces (e.g., an application program interface (API)).

The performance of certain of the operations may be distributed among the processors, not only residing within a single machine, but deployed across a number of machines. In some example embodiments, the processors or processor-implemented modules are located in a single geographic location (e.g., within a home environment, an office environment, or a server farm). In other example embodiments, the processors or processor-implemented modules are distributed across a number of geographic locations.

Applications

Figure 15:
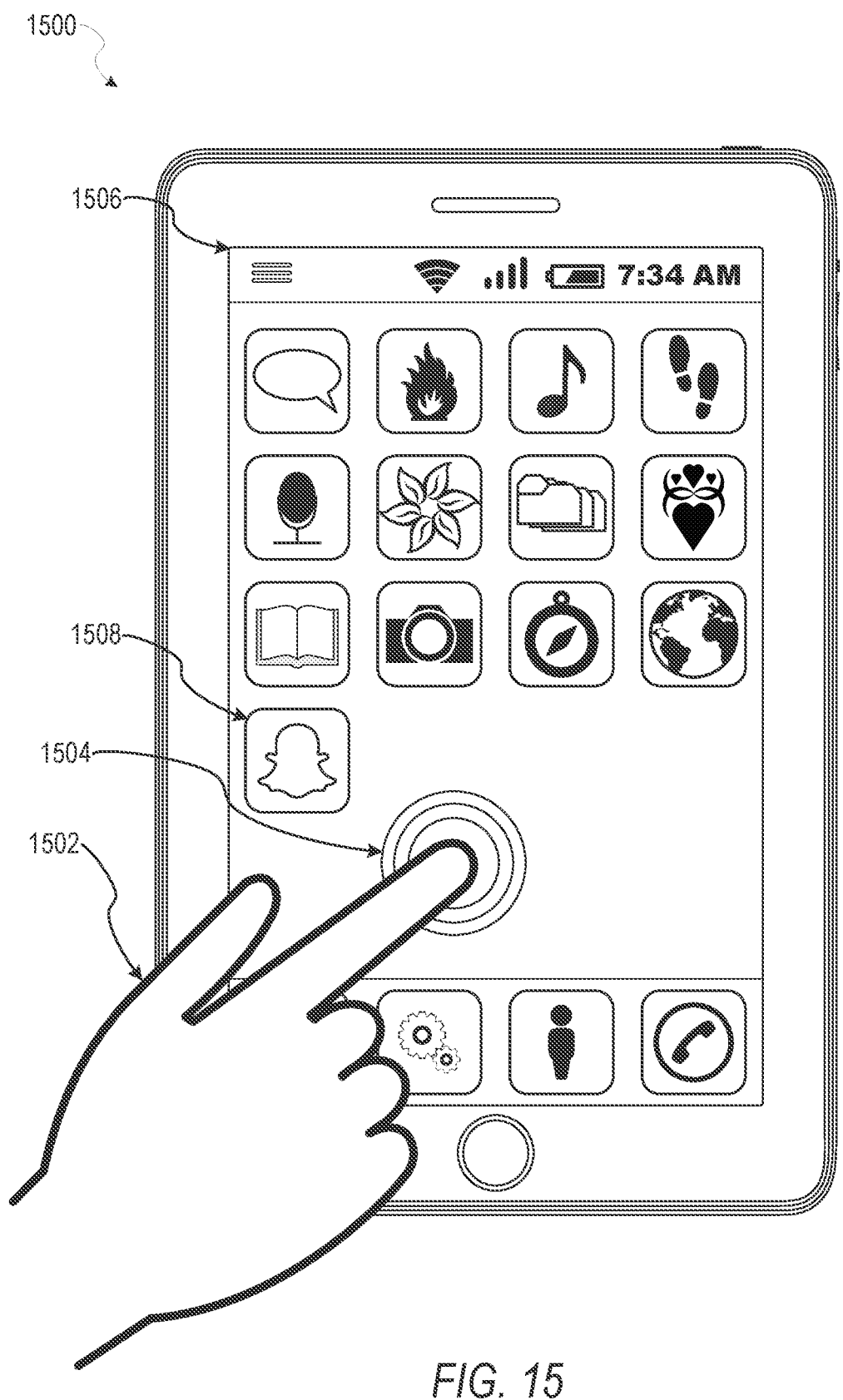
FIG. 15 is a user interface diagram depicting an example mobile device and mobile operating system interface, according to some example embodiments.

FIG. 15 illustrates an example mobile device 1500 executing a mobile operating system (e.g., IOS™, ANDROID™, WINDOWS® Phone, or other mobile operating systems), consistent with some embodiments. In one embodiment, the mobile device 1500 includes a touch screen operable to receive tactile data from a user 1502. For instance, the user 1502 may physically touch 1504 the mobile device 1500, and in response to the touch 1504, the mobile device 1500 may determine tactile data such as touch location, touch force, or gesture motion. In various example embodiments, the mobile device 1500 displays a home screen 1506 (e.g., Springboard on IOS™) operable to launch applications or otherwise manage various aspects of the mobile device 1500. In some example embodiments, the home screen 1506 provides status information such as battery life, connectivity, or other hardware statuses. The user 1502 can activate user interface elements by touching an area occupied by a respective user interface element. In this manner, the user 1502 interacts with the applications of the mobile device 1500. For example, touching the area occupied by a particular icon included in the home screen 1506 causes launching of an application corresponding to the particular icon.

Many varieties of applications (also referred to as "apps") can be executing on the mobile device 1500, such as native applications (e.g., applications programmed in Objective-C, Swift, or another suitable language running on IOS™ or applications programmed in Java running on ANDROID™), mobile web applications (e.g., applications written in Hypertext Markup Language-5 (HTML5)), or hybrid applications (e.g., a native shell application that launches an HTML5 session). For example, the mobile device 1500 includes a messaging app, an audio recording app, a camera app, a book reader app, a media app, a fitness app, a file management app, a location app, a browser app, a settings app, a contacts app, a telephone call app, or other apps (e.g., gaming apps, social networking apps, biometric monitoring apps). In another example, the mobile device 1500 includes a social messaging app 1508 such as SNAPCHAT® that, consistent with some embodiments, allows users 1502 to exchange ephemeral messages that include media content. In this example, the social messaging app 1510 can incorporate aspects of embodiments described herein. For example, in some embodiments, the social messaging application includes an ephemeral gallery of media created by users 1502 of the social messaging application. These galleries may consist of videos or pictures posted by a user 1502 and made viewable by contacts (i.e., "friends") of the user 1502, represented by content icons for associated with a content originator who is included in the contacts. Alternatively, public galleries may be created by administrators (e.g., content originators) of the social messaging application consisting of media from any users 1502 of the application (and accessible by all users 1502). In yet another embodiment, the social messaging application may include a "magazine" feature which consists of articles and other content generated by publishers (e.g., content originators) on the social messaging application's platform and accessible by any users 1502. Similar to the contacts of a user 1502 of the social messaging application, the administrators of public galleries and publishers of articles may be represented by content icons or organizations associated with administrators and publishers may be represented by the content icons. Any of these environments or platforms may be used to implement concepts of the present invention, including, e.g., dynamic presentation of user interface elements using differing organizational schemes in response to user input.

In some embodiments, an ephemeral message system may include messages having ephemeral video clips or images which are deleted following a deletion trigger event such as a viewing time or viewing completion. In such embodiments, a device may track user interface inputs (e.g., touchscreen interactions) during presentation of an ephemeral message, and may implement any tracking, command, or interface method describe herein both as part of a generation of content for an ephemeral message or as part of a user 1502 interacting with an ephemeral message.

Software Architecture

Figure 16:
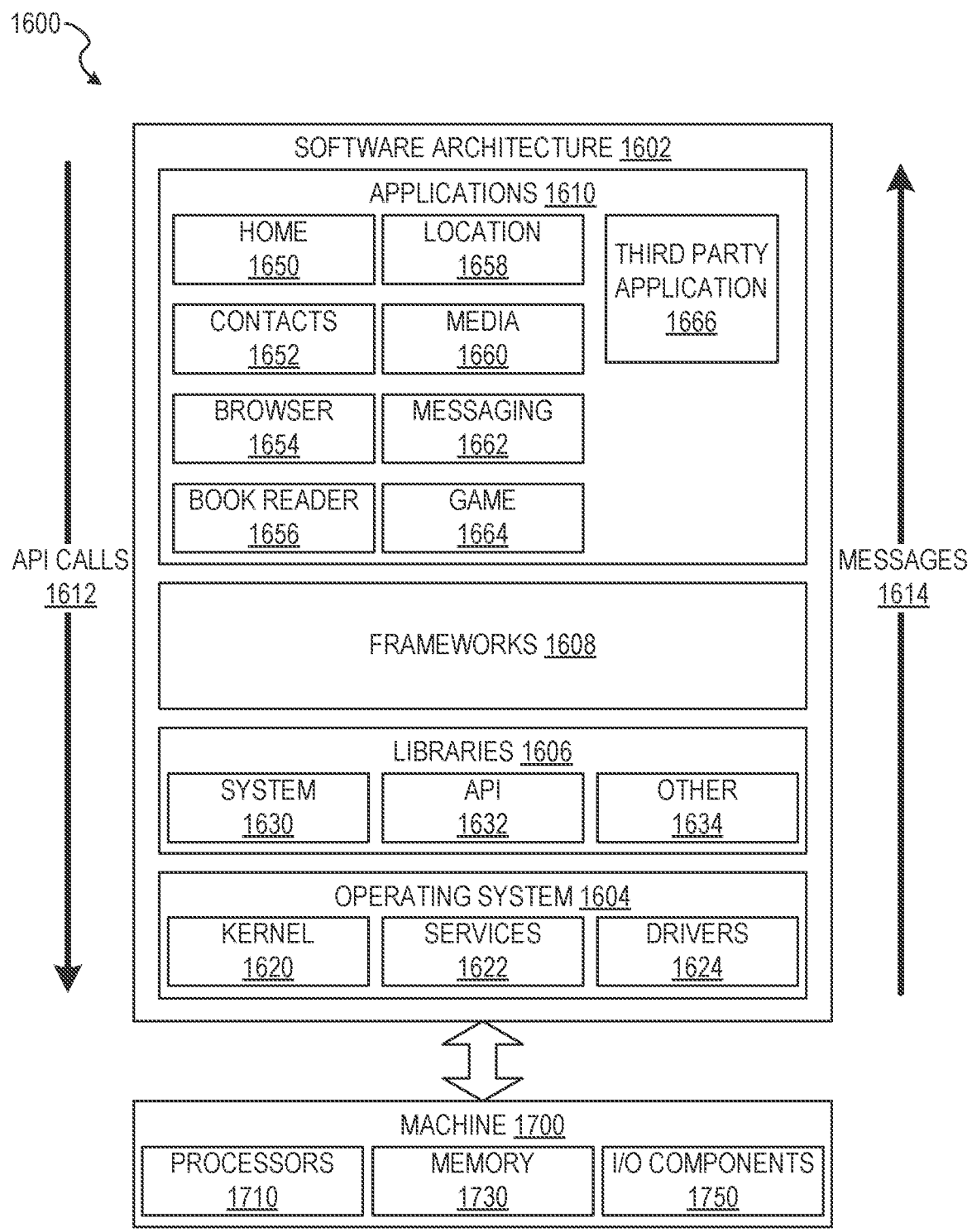
FIG. 16 is a block diagram illustrating an example of a software architecture that may be installed on a machine, according to some example embodiments.

FIG. 16 is a block diagram 1600 illustrating an architecture of software 1602, which can be installed on the devices described above. FIG. 16 is merely a non-limiting example of a software architecture, and it will be appreciated that many other architectures can be implemented to facilitate the functionality described herein. In various embodiments, the software 1602 is implemented by hardware such as machine a 1700 of FIG. 17 that includes processors 1710, memory 1730, and I/O components 1750. In this example architecture, the software 1602 can be conceptualized as a stack of layers where each layer may provide a particular functionality. For example, the software 1602 includes layers such as an operating system 1604, libraries 1606, frameworks 1608, and applications 1610. Operationally, the applications 1610 invoke application programming interface (API) calls 1612 through the software stack and receive messages 1614 in response to the API calls 1612, consistent with some embodiments.

In various implementations, the operating system 1604 manages hardware resources and provides common services. The operating system 1604 includes, for example, a kernel 1620, services 1622, and drivers 1624. The kernel 1620 acts as an abstraction layer between the hardware and the other software layers, consistent with some embodiments. For example, the kernel 1620 provides memory management, processor management (e.g., scheduling), component management, networking, and security settings, among other functionality. The services 1622 can provide other common services for the other software layers. The drivers 1624 are responsible for controlling or interfacing with the underlying hardware, according to some embodiments. For instance, the drivers 1624 can include display drivers, camera drivers, BLUETOOTH® drivers, flash memory drivers, serial communication drivers (e.g., Universal Serial Bus (USB) drivers), WI-FI® drivers, audio drivers, power management drivers, and so forth.

In some embodiments, the libraries 1606 provide a low-level common infrastructure utilized by the applications 1610. The libraries 1606 can include system libraries 1630 (e.g., C standard library) that can provide functions such as memory allocation functions, string manipulation functions, mathematic functions, and the like. In addition, the libraries 1606 can include API libraries 1632 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1606 can also include a wide variety of other libraries 1634 to provide many other APIs to the applications 1610.

The frameworks 1608 provide a high-level common infrastructure that can be utilized by the applications 1610, according to some embodiments. For example, the frameworks 1608 provide various graphic user interface (GUI) functions, high-level resource management, high-level location services, and so forth. The frameworks 1608 can provide a broad spectrum of other APIs that can be utilized by the applications 1610, some of which may be specific to a particular operating system or platform.

In an example embodiment, the applications 1610 include a home application 1650, a contacts application 1652, a browser application 1654, a book reader application 1656, a location application 1658, a media application 1660, a messaging application 1662, a game application 1664, and a broad assortment of other applications such as a third party application 1666. According to some embodiments, the applications 1610 are programs that execute functions defined in the programs. Various programming languages can be employed to create the applications 1610, structured in a variety of manners, such as object-oriented programming languages (e.g., Objective-C, Java, or C++) or procedural programming languages (e.g., C or assembly language). In a specific example, the third party application 1666 (e.g., an application developed using the ANDROID™ or IOS™ software development kit (SDK) by an entity other than the vendor of the particular platform) may be mobile software running on a mobile operating system such as IOS™, ANDROID™ WINDOWS® PHONE, or another mobile operating systems. In this example, the third party application 1666 can invoke the API calls 1612 provided by the operating system 1604 to facilitate functionality described herein.

Example Machine Architecture and Machine-Readable Medium

Figure 17:
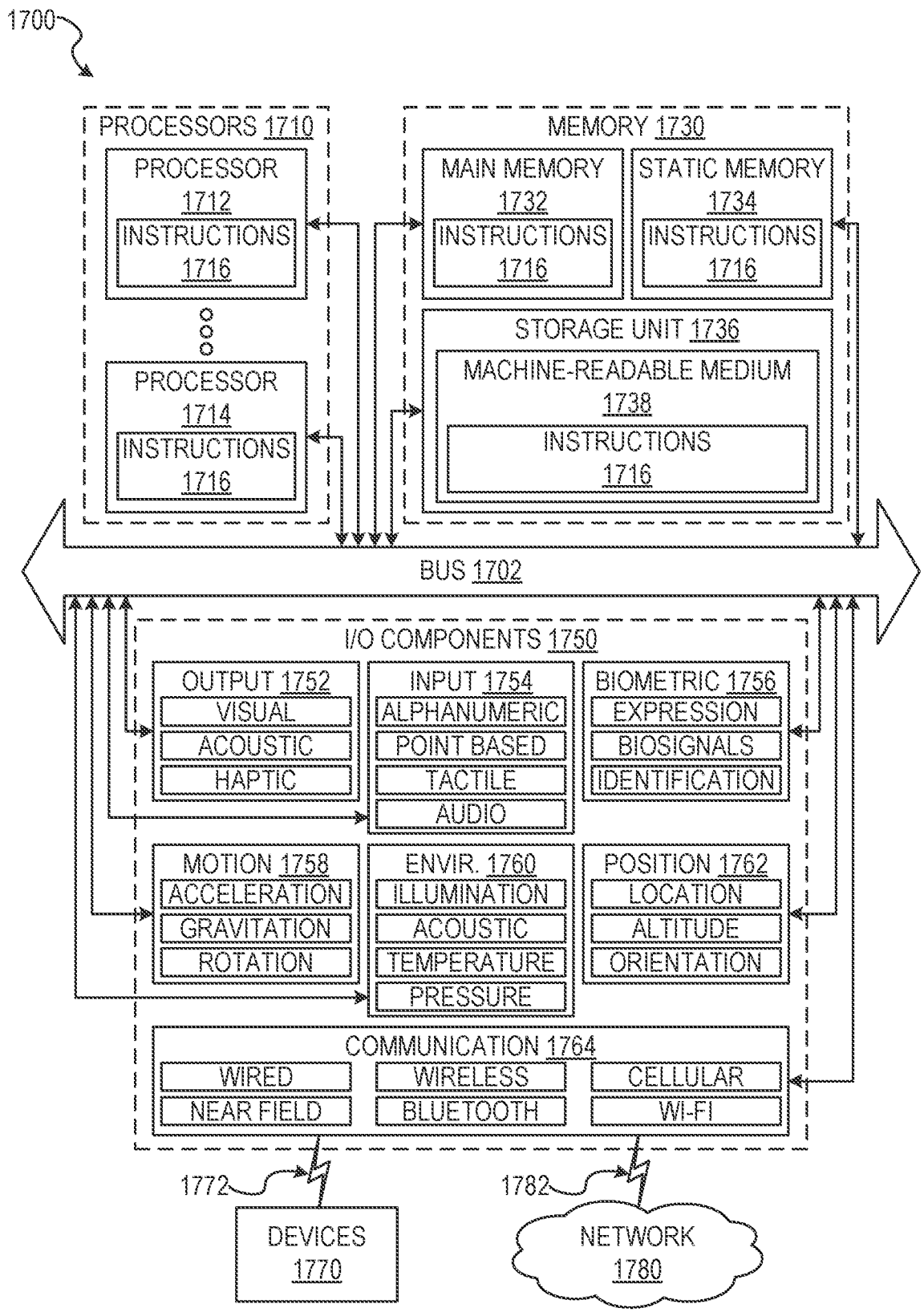
FIG. 17 is a block diagram presenting a diagrammatic representation of a machine in the form of a computer system within which a set of instructions may be executed for causing the machine to perform any of the methodologies discussed herein, according to an example embodiment.

FIG. 17 is a block diagram illustrating components of a machine 1700, according to some embodiments, able to read instructions from a machine-readable medium (e.g., a machine-readable storage medium) and perform any of the methodologies discussed herein. Specifically, FIG. 17 shows a diagrammatic representation of the machine 1700 in the example form of a computer system, within which instructions 1716 (e.g., software, a program, an application, an applet, an app, or other executable code) for causing the machine 1700 to perform any of the methodologies discussed herein can be executed. In alternative embodiments, the machine 1700 operates as a standalone device or can be coupled (e.g., networked) to other machines. In a networked deployment, the machine 1700 may operate in the capacity of a server machine or a client machine in a server-client network environment, or as a peer machine in a peer-to-peer (or distributed) network environment. The machine 1700 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1716, sequentially or otherwise, that specify actions to be taken by the machine 1700. Further, while only a single machine 1700 is illustrated, the term "machine" shall also be taken to include a collection of machines 1700 that individually or jointly execute the instructions 1716 to perform any of the methodologies discussed herein.

In various embodiments, the machine 1700 comprises processors 1710, memory 1730, and I/O components 1750, which can be configured to communicate with each other via a bus 1702. In an example embodiment, the processors 1710 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) includes, for example, a processor 1712 and a processor 1714 that may execute the instructions 1716. The term "processor" is intended to include multi-core processors that may comprise two or more independent processors (also referred to as "cores") that can execute instructions 1716 contemporaneously. Although FIG. 17 shows multiple processors 1710, the machine 1700 may include a single processor 1712 with a single core, a single processor 1712 with multiple cores (e.g., a multi-core processor 1712), multiple processors 1712, 1714 with a single core, multiple processors 1712, 1714 with multiples cores, or any combination thereof.

The memory 1730 comprises a main memory 1732, a static memory 1734, and a storage unit 1736 accessible to the processors 1710 via the bus 1702, according to some embodiments. The storage unit 1736 can include a machine-readable medium 1738 on which are stored the instructions 1716 embodying any of the methodologies or functions described herein. The instructions 1716 can also reside, completely or at least partially, within the main memory 1732, within the static memory 1734, within at least one of the processors 1710 (e.g., within the processor 1712's cache memory), or any suitable combination thereof, during execution thereof by the machine 1700. Accordingly, in various embodiments, the main memory 1732, the static memory 1734, and the processors 1710 are considered machine-readable media 1738.

As used herein, the term "memory" refers to a machine-readable medium 1738 able to store data temporarily or permanently and may be taken to include, but not be limited to, random-access memory (RAM), read-only memory (ROM), buffer memory, flash memory, and cache memory. While the machine-readable medium 1738 is shown, in an example embodiment, to be a single medium, the term "machine-readable medium" should be taken to include a single medium or multiple media (e.g., a centralized or distributed database, or associated caches and servers) able to store the instructions 1716. The term "machine-readable medium" shall also be taken to include any medium, or combination of multiple media, that is capable of storing instructions (e.g., instructions 1716) for execution by a machine (e.g., machine 1700), such that the instructions 1716, when executed by processors of the machine 1700 (e.g., processors 1710), cause the machine 1700 to perform any of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 1750 include a wide variety of components to receive input, provide output, produce output, transmit information, exchange information, capture measurements, and so on. In general, it will be appreciated that the I/O components 1750 can include many other components that are not shown in FIG. 17. The I/O components 1750 are grouped according to functionality merely for simplifying the following discussion, and the grouping is in no way limiting. In various example embodiments, the I/O components 1750 include output components 1752 and input components 1754. The output components 1752 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1754 include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1750 include biometric components 1756, motion components 1758, environmental components 1760, or position components 1762, among a wide array of other components. For example, the biometric components 1756 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1758 include acceleration sensor components (e.g., accelerometer), gravitation sensor components, rotation sensor components (e.g., gyroscope), and so forth. The environmental components 1760 include, for example, illumination sensor components (e.g., photometer), temperature sensor components (e.g., thermometers that detect ambient temperature), humidity sensor components, pressure sensor components (e.g., barometer), acoustic sensor components (e.g., microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1762 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1750 may include communication components 1764 operable to couple the machine 1700 to a network 1780 or devices 1770 via a coupling 1782 and a coupling 1772, respectively. For example, the communication components 1764 include a network interface component or another suitable device to interface with the network 1780. In further examples, communication components 1764 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 1770 may be another machine or any of a wide variety of peripheral devices (e.g., a peripheral device coupled via a Universal Serial Bus (USB)).

Moreover, in some embodiments, the communication components 1764 detect identifiers or include components operable to detect identifiers. For example, the communication components 1764 include radio frequency identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1764, such as location via Internet Protocol (IP) geo-location, location via WI-FI® signal triangulation, location via detecting a BLUETOOTH® or NFC beacon signal that may indicate a particular location, and so forth.

Transmission Medium

In various example embodiments, portions of the network 1780 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 1780 or a portion of the network 1780 may include a wireless or cellular network, and the coupling 1782 may be a Code Division Multiple Access (CDMA) connection, a Global System for Mobile communications (GSM) connection, or another type of cellular or wireless coupling. In this example, the coupling 1782 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1716 are transmitted or received over the network 1780 using a transmission medium via a network interface device (e.g., a network interface component included in the communication components 1764) and utilizing any one of a number of well-known transfer protocols (e.g., Hypertext Transfer Protocol (HTTP)). Similarly, in other example embodiments, the instructions 1716 are transmitted or received using a transmission medium via the coupling 1772 (e.g., a peer-to-peer coupling) to the devices 1770. The term "transmission medium" shall be taken to include any intangible medium that is capable of storing, encoding, or carrying the instructions 1716 for execution by the machine 1700, and includes digital or analog communications signals or other intangible media to facilitate communication of such software.

Furthermore, the machine-readable medium 1738 is a non-transitory machine-readable storage medium (in other words, not having any transitory signals) in that it does not embody a propagating signal. However, labeling the machine-readable medium 1738 "non-transitory" should not be construed to mean that the medium is incapable of movement; the medium should be considered as being transportable from one physical location to another. Additionally, since the machine-readable medium 1738 is tangible, the medium may be considered to be a machine-readable device.

Language

Throughout this specification, plural instances may implement components, operations, or structures described as a single instance. Although individual operations of methods are illustrated and described as separate operations, individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method, comprising:
causing, by a processor, presentation of a plurality of content icons within a graphical user interface, the plurality of content icons comprising a first set of content and second set of content;
monitoring a consumption status of the first set of content;
based on the consumption status, modifying a content icon for a content item of the first set of content to indicate consumption of a first portion of content associated with the content item, the modifying comprising blurring a first portion of the content icon, the blurring of the first portion of the content icon being proportional to an amount of consumption of the content item;
automatically transferring the first portion of content associated with the content item to the second set of content;
retaining a second portion of content associated with the content item in the first set of content, the second portion of content representing unconsumed content; and
causing presentation of the modified content icon for the content item as a part of the second set of content and the first set of content within the graphical user interface.

2. The method of claim 1, wherein the first set of content has a first order and the second set of content has a second order distinct from the first order.

3. The method of claim 2, wherein the first order organizes the first set of content based on a time of receiving each content item of the first set of content.

4. The method of claim 2, wherein the second order organizes the second set of content based on an identity of a content originator for each content item of the second set of content.

5. The method of claim 2, wherein automatically transferring the first portion of content associated with the content item to the second set of content further comprises:
associating the content item with the second set of content; and
organizing the content item within the second set of content according to the second order.

6. The method of claim 2, wherein the first set of content is presented in a first area of a user interface and the second set of content is presented in a second area of a user interface.

7. The method of claim 1 further comprising:
causing presentation of a consumption indicator having a first portion and a second portion distinct from the first portion, the first portion representing unconsumed content items and the second portion representing consumed content items; and
based on receiving the consumption notification, automatically modifying a size of the first portion of the consumption indicator and a size of the second portion of the consumption indicator.

8. The method of claim 7, wherein the consumption indicator is a track for a scroll bar.

9. The method of claim 7, wherein the first portion of the consumption indicator is presented as a first color and the second portion of the consumption indicator is presented as a second color distinct from the first color.

10. The method of claim 7, wherein the first portion of the consumption indicator is sized proportionately to the unconsumed content items and the second portion of the consumption indicator is sized proportionately to the consumed content items.

11. The method of claim 10, wherein modifying the size of the first portion of the consumption indicator based on receiving the consumption notification reduces a length of the first portion of the consumption indicator and increases the length of the second portion of the consumption indicator in proportion to a number of content items consumed.

12. A system, comprising:
one or more processors; and
a non-transitory machine-readable storage medium storing processor executable instructions that, when executed by the one or more processors, cause the one or more processors to perform operations comprising:
causing presentation of a plurality of content icons within a graphical user interface, the plurality of content icons comprising a first set of content and second set of content;
monitoring a consumption status of the first set of content;
based on the consumption status, modifying a content icon for a content item of the first set of content to indicate consumption of a first portion of content associated with the content item, the modifying comprising blurring a first portion of the content icon, the blurring of the first portion of the content icon being proportional to an amount of consumption of the content item;
automatically transferring the first portion of content associated with the content item to the second set of content;
retaining a second portion of content associated with the content item in the first set of content, the second portion of content representing unconsumed content; and
causing presentation of the modified content icon for the content item as a part of the second set of content and the first set of content within the graphical user interface.

13. The system of claim 12, wherein the first set of content has a first order and the second set of content has a second order distinct from the first order, and, in automatically transferring the first portion of content associated with the content item to the second set of content, the processor-executable instructions cause the one or more processors to perform operations comprising:
 associating the content item with the second set of content; and
 organizing the content item within the second set of content according to the second order.

14. The system of claim 13, wherein the first order organizes the first set of content based on a time of receiving each content item of the first set of content and the second order organizes the second set of content based on an identity of a content originator for each content item of the second set of content.

15. The system of claim 12, wherein the processor executable instructions cause the one or more processors to perform operations comprising:
 based on the consumption status, receiving a consumption notification for the first portion of content associated with the content item of the first set of content;
 causing presentation of a consumption indicator having a first portion and a second portion distinct from the first portion, the first portion of the consumption indicator representing unconsumed content items and the second portion of the consumption indicator representing consumed content items; and
 based on receiving the consumption notification, automatically modifying a size of the first portion of the consumption indicator and a size of the second portion of the consumption indicator.

16. The system of claim 15, wherein the first portion of the consumption indicator is sized proportionately to a number of the unconsumed content items and the second portion of the consumption indicator is sized proportionately to a number of the consumed content items.

17. The system of claim 15, wherein modifying the size of the first portion of the consumption indicator based on receiving the consumption notification reduces a length of the first portion and increases the length of the second portion of the consumption indicator in proportion to a number of content items consumed.

18. A non-transitory machine-readable storage medium comprising processor executable instructions that, when executed by a processor of a machine, cause the machine to perform operations comprising:
 causing presentation of a plurality of content icons within a graphical user interface, the plurality of content icons comprising a first set of content and second set of content;
 monitoring a consumption status of the first set of content;
 based on the consumption status, modifying a content icon for a content item of the first set of content to indicate consumption of a first portion of content associated with the content item, the modifying comprising blurring a first portion of the content icon, the blurring of the first portion of the content icon being proportional to an amount of consumption of the content item;
 automatically transferring the first portion of content associated with the content item to the second set of content;
 retaining a second portion of content associated with the content item in the first set of content, the second portion of content representing unconsumed content; and
 causing presentation of the modified content icon for the content item as a part of the second set of content and the first set of content within the graphical user interface.

19. The non-transitory machine-readable storage medium of claim 18, wherein the first order organizes the first set of content based on a time of receiving each content item of the first set of content and the second order organizes the second set of content based on an identity of a content originator for each content item of the second set of content.

20. The non-transitory machine-readable storage medium of claim 19, wherein the operations further comprise:
 based on the consumption status, receiving a consumption notification for the first portion of content associated with the content item of the first set of content;
 causing presentation of a consumption indicator having a first portion and a second portion distinct from the first portion, the first portion of the consumption indicator representing unconsumed content items and the second portion of the consumption indicator representing consumed content items; and
 based on receiving the consumption notification, automatically modifying a size of the first portion of the consumption indicator and a size of the second portion of the consumption indicator.

* * * * *